US012390953B2

(12) United States Patent
McMillan

(10) Patent No.: US 12,390,953 B2
(45) Date of Patent: Aug. 19, 2025

(54) WOOD PROCESSING DEVICE

(71) Applicant: Jaron Lyell McMillan, Christchurch (NZ)

(72) Inventor: Jaron Lyell McMillan, Christchurch (NZ)

( * ) Notice: Subject to any disclaimer, the term of this patent is extended or adjusted under 35 U.S.C. 154(b) by 251 days.

(21) Appl. No.: 18/272,667

(22) PCT Filed: Jan. 19, 2022

(86) PCT No.: PCT/IB2022/050411
§ 371 (c)(1),
(2) Date: Jul. 17, 2023

(87) PCT Pub. No.: WO2022/157627
PCT Pub. Date: Jul. 28, 2022

(65) Prior Publication Data

US 2024/0075650 A1 Mar. 7, 2024

(30) Foreign Application Priority Data

Jan. 20, 2021 (NZ) ........................................ 772131
Sep. 14, 2021 (NZ) ........................................ 780116

(51) Int. Cl.
*B27L 7/06* (2006.01)
*B27L 7/00* (2006.01)

(52) U.S. Cl.
CPC .. *B27L 7/06* (2013.01); *B27L 7/00* (2013.01)

(58) Field of Classification Search
CPC ................. B27L 7/00; B27L 7/06; B27L 7/08
See application file for complete search history.

(56) References Cited

U.S. PATENT DOCUMENTS 3,862,651 A * 1/1975 Heikkinen ................ B27L 7/00 144/194
4,456,044 A 6/1984 Clones
4,799,519 A 1/1989 Forbes et al.
(Continued)

FOREIGN PATENT DOCUMENTS

CH 228254 A 8/1943
DE 19633759 A1 2/1998
(Continued)

*Primary Examiner* — Matthew Katcoff
(74) *Attorney, Agent, or Firm* — SALIWANCHIK, LLOYD & EISENSCHENK

(57) ABSTRACT

A wood processing device that includes an inlet, an outer unit and a cutting unit, where: —the outer unit includes a first outer unit face and outer unit sides at least partially surrounding an outer unit interior; —the inlet extends away from the first outer unit face; —the inlet is uppermost when the wood processing device is in use; —the inlet is configured to accept wood for processing and provide a path through the first outer unit face to the outer unit interior; —the cutting unit includes a cutting blade with a cutting blade edge; and—the cutting unit lies, at least partially, within the outer unit interior with the cutting blade immediately adjacent, and essentially parallel to, the first outer unit face; wherein the wood processing unit further includes at least one movement device configured to move the cutting unit such that the cutting blade edge moves across an open end of the inlet.

20 Claims, 26 Drawing Sheets

(56) References Cited

U.S. PATENT DOCUMENTS

| | | | | |
|---|---|---|---|---|
| 6,325,118 | B1 * | 12/2001 | Atkinson | B27L 7/00<br>144/195.1 |
| 10,391,668 | B2 * | 8/2019 | Lammi | B23D 59/001 |
| 10,464,149 | B2 * | 11/2019 | Maki-Haapoja | B27L 7/00 |

FOREIGN PATENT DOCUMENTS

| | | | |
|---|---|---|---|
| DE | 10242902 | A1 | 3/2004 |
| EP | 0890421 | A2 | 1/1999 |
| WO | 2015/075320 | A1 | 5/2015 |

* cited by examiner

WOOD PROCESSING DEVICE

CROSS REFERENCE TO RELATED APPLICATIONS

This application is a National Stage Application of International Application Number PCT/IB2022/050411, filed Jan. 19, 2022; which claims priority to New Zealand Application No. 772131, filed Jan. 20, 2021 and New Zealand Application No. 780116, filed Sep. 14, 2021.

TECHNICAL FIELD

The present device is a wood cutting and splitting device.

BACKGROUND ART

There is an increasing desire to use wood as a fuel rather than coal or oil as it is essentially a renewable resource.

To use wood in a combustion chamber it needs to be suitably sized, this involves cutting and often splitting logs and branches.

The most basic way to produce suitably sized wood for use as firewood is to debranch then cut suitably sized branches and the trunk to produce cut sections of the desired length. The cut sections are then split to produce firewood of the desired size. The cutting is normally by chainsaw, though if a saw bench is used a circular saw can be used. The splitting can be a purely manual step with wedges hammered into the cut sections, or more commonly accomplished using hydraulic wedges. Cutting to length and then splitting in this way is time consuming and for processing large volumes of timber firewood processors have been developed.

The simplest firewood processors are simply tractor or trailer mounted wood splitters that accept cut sections of firewood. Some of these simpler firewood processors use the hydraulic feed from a tractor whereas others include a separately powered hydraulic pump, a generator and electrically moved splitter or are a processing table with a manually operated hydraulic cylinder attached to a splitting blade.

More sophisticated firewood processors take longer lengths of debranched trunk or larger branches (2.5 m to 10 m in length) resting on a conveyor or table with rollers. The debranched timber is fed through a cutting station where cut sections are created. The common forms of cutting station use a chainsaw or circular saw, controlled by an operator or sometimes automatically. The cut sections are then moved to a splitting station where they are split. The splitting station includes powered wedges which are forced into the cut sections, or in some configurations the cut sections are forced through one or more splitting bars. The resultant firewood is then discharged, often by a conveyor, into a hopper or storage bin. These firewood processors may be trailer mounted, though many are semi-permanent or permanent installations These firewood processors are complex pieces of equipment that require careful maintenance to ensure they continue to operate, something that can be difficult onsite. These firewood processors generally have the timber brought to them which often requires a staging area and a semi-permanent location.

Any discussion of the prior art throughout the specification is not an admission that such prior art is widely known or forms part of the common general knowledge in the field.

The present wood processing device provides a useful choice for a consumer and/or overcomes or ameliorates one or more deficiencies in the existing wood processing device.

Disclosure of Invention

The present invention provides a wood processing device that includes an inlet, an outer unit and a cutting unit, where:

- the outer unit includes a first outer unit face and outer unit sides at least partially surrounding an outer unit interior;
- the inlet extends away from the first outer unit face;
- the inlet is uppermost when the wood processing device is in use;
- the inlet is configured to accept wood for processing and provide a path through the first outer unit face to the outer unit interior;
- the cutting unit includes a cutting blade with a cutting blade edge; and
- the cutting unit lies, at least partially, within the outer unit interior with the cutting blade immediately adjacent, and essentially parallel to, the first outer unit face;

wherein the wood processing unit further includes at least one movement device configured to move the cutting unit such that the cutting blade edge moves across an open end of the inlet.

Preferably the outer unit includes two longitudinally aligned support strips which, directly or indirectly, support the cutting unit. In one preferred form the cutting unit base is supported by the support strips. In an alternative form the cutting blade is supported by the support strips.

In one configuration the cutting unit includes an outlet extending from, and coterminous with, a cutting unit base, where the outlet provides a path leading from said outer unit interior, wherein the cutting blade and cutting unit base are opposite faces of the cutting unit; the cutting unit further includes two cutting unit sides and a cutting unit end wall which separate the cutting blade and the cutting unit base.

Preferably the cutting unit further includes a splitting blade that is coterminous with the cutting blade, the splitting blade extends away from the cutting blade towards the outlet, such that the splitting blade is substantially perpendicular to the cutting blade and the cutting blade edge.

Preferably there is at least one blade wedge which extends away from the cutting blade towards the outlet.

Preferably there is at least one blade wedge on each side of the splitting blade.

Preferably said at least one blade wedge is triangular in cross-section with two vertices lying on a face of the cutting blade with the apex lying closest to the cutting unit end wall. Preferably the blade wedges extend away from the cutting blade between 25 mm and 100 mm.

Preferably the splitting blade is planar and aligned approximately parallel to the cutting unit sides. Preferably the splitting blade does not extend beyond the cutting blade edge. In a highly preferred form the splitter edge is closer to the cutting unit end wall than the cutting blade edge. Preferably the splitting blade is releasably attached to the cutting blade.

Preferably the cutting unit further includes at least one splitting wheel which is configured to rotate around a splitting pin. Preferably there is one splitting pin attached to each cutting unit side and each longitudinal axis of the splitting pins and the inlet are approximately parallel. In a preferred form each splitting wheel, when viewed in plan view, is a star with 4 to 10 points. Preferably the cutting blade edge is closer to the cutting unit end wall than each splitting pin present. Preferably the splitting wheels are releasably attached.

Preferably the wood processing device includes a stop configured to control the longitudinal movement of wood being processed within the outer unit interior. Preferably the stop is a plate including apertures dimensioned to allow one or more of the following items to move through the stop, the cutting blade, the splitting blade and the blade wedges. Preferably, when present, the stop includes an aperture that allows each splitting wheel present to partially or completely pass through the stop.

Preferably each splitting wheel is connected together so they rotate at the same time.

Preferably the cross-sectional shape of the inlet in plan view is selected from circular, oval, diamond, rectangular, a combination of oval and diamond, triangular, or any regular or irregular polygon with between 5 and 8 sides.

Preferably the cutting unit is moved longitudinally within the outer unit interior by the at least one movement device. Preferably at one or more of the at least one movement device is a hydraulic cylinder.

The present invention alternatively provides a wood processing device including a cutting unit and an outer unit, where:

- the outer unit includes an inlet configured to accept wood for processing that in use is uppermost;
- the cutting unit includes a cutting blade and a cutting unit base;
- the cutting blade is adjacent the inlet;
- the cutting unit base includes a support face and a pushing surface which are coterminous along one edge, such that, in use, the support face is the uppermost face of the cutting base and the pushing surface extends downwards; and
- the cutting blade and support face are spaced apart by a distance WL;

such that the wood processing device further includes a splitter that faces the pushing surface and a movement device configured to move the cutting blade across an open end of the inlet as it changes the distance between the pushing surface and the splitter.

Preferably the support face and the pushing surface are approximately at right angles.

Preferably in a first position of the cutting unit the cutting blade does not extend across the open end of the inlet and the pushing surface is adjacent the splitter.

Preferably, in a second position of the cutting unit, the cutting blade extends completely across the open end of the inlet and the pushing surface is a maximum distance from the splitter.

Preferably in the second position the support surface overlaps the open end of the inlet by a small amount. Preferably the small amount is between 1% and 10% of the maximum dimension of the open end of the inlet.

Preferably the cutting unit base includes an auxiliary support and a support hinge, where the support hinge is coterminous with the pushing surface, support face and the auxiliary support such that:

- in the first position the auxiliary support is in a pushing configuration in which the auxiliary support lies immediately adjacent the pushing surface and between the pushing surface and the splitter; and
- in the second position the auxiliary support is in a support configuration in which the auxiliary support in combination with the support face forms an essentially planar extended support surface; and when moving from the support configuration to the pushing configuration the auxiliary support moves along an auxiliary path which changes the angle of the auxiliary support in a controlled manner.

Preferably the auxiliary support includes guide portions that are configured to follow the auxiliary path. In one preferred form the auxiliary path is formed by two or more auxiliary pins which the guide portions are configured to releasably engage. In an alternative preferred form, a preformed channel or strip forms the auxiliary path. Preferably the guide portions follow the auxiliary path without contacting the auxiliary pins or any surface of the channel or strip.

Preferably the wood processing device includes a wood stop. Preferably the wood stop is rigidly attached to the outer unit. Preferably the wood stop is a semi-circular plate that is aligned with the open end of the inlet, forming a spaced apart short section of a portion of the inlet.

Preferably the pushing surface includes a splitting aperture dimensioned to accept an extended portion of the splitter, a splitting blade.

Preferably the auxiliary support includes auxiliary retention features configured to releasably engage with wood being processed.

For all configurations, preferably the cutting blade edge, in plan view, is concave. In a highly preferred form, the cutting blade edge is the concave portion of a concave pentagon. In a preferred form the concave pentagon has an axis of symmetry through the cutting blade edge.

Preferably the wood processing device includes a primary trimming section which circumferentially surrounds a primary engagement section of the inlet, both the primary trimming section and the primary engagement section include a trimming blade, each trimming blade includes a trimming blade edge, said trimming blade edges are configured to act cooperatively to cut an object that lies between them. Preferably said primary trimming section is configured to be moved circumferentially around the inlet and move the trimming blade edges towards then away from each other. Preferably the wood processing device further includes a drive unit configured to rotate the primary trimming section around the primary engagement section.

Preferably the cutting unit further includes a cut-off blade extending from, essentially perpendicularly, the cutting blade through an aperture in the outer unit, a cut-off aperture, said cut-off blade includes a cut-off blade edge which is an edge of the cut-off blade that lies closest to the inlet when the cutting unit is in a first position.

Preferably the cutting unit includes a pass-through door which is a door in the cutting unit base that is aligned with the inlet when the cutting unit is in a first position. Preferably the pass-through door is a door that fills a pass-through aperture which is an aperture in the cutting unit base that extends from the outlet towards the stop. Preferably the pass-through door is a hinged door. Preferably the pass-through aperture terminates at the stop. In an alternative preferred form the pass-through aperture terminates before the stop (50). Preferably the pass-through door is hinged such that, when it is opened, it swings away from the outlet. In an alternative preferred form the pass-through door is not hinged.

Preferably the term wood for processing refers to at least one piece of wood.

BRIEF DESCRIPTION OF DRAWINGS

By way of example only, a preferred embodiment of the present invention is described in detail below with reference to the accompanying drawings, in which.

Figures 1, 2, 3:
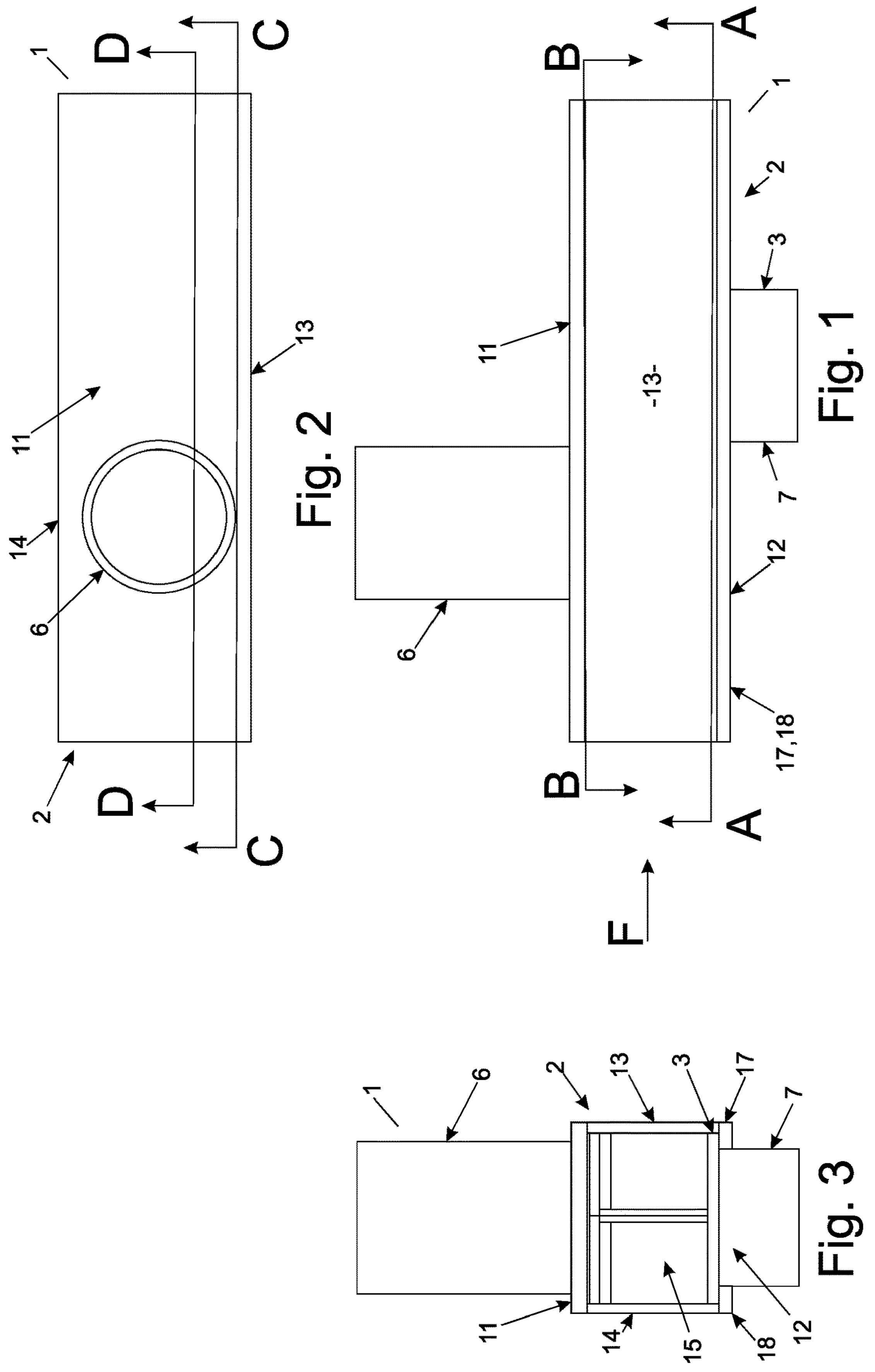
FIG. 1 is a side view of a first variant of a wood processing device.
FIG. 2 is a plan view of a first variant of the wood processing device shown in FIG. 1.
FIG. 3 is an end view of the first variant of the wood processing device in the direction of arrow F shown in at least FIG. 1.

Please note that the drawings are not to any specific scale and some features may be exaggerated or scaled differently in the same drawing for clarity.

Definitions

Approximately—this is intended to mean within +/−15%, or if it relates to an angle within +/−10°.

Channel—Similar in shape to a parallel flange channel (PFC);

Essentially/Substantially—this is intended to mean within +/−5%, or if it relates to an angle within +/−5°.

Trapezium—Quadrilateral with one pair of parallel sides;

First Variant of the Invention

Referring to FIGS. 1 to 4 a first variant of a wood processing device (1) including an outer unit (2) and a cutting unit (3) is shown, with an inlet (6) extending from the outer unit (2) and an outlet (7) extending from the cutting unit (2).

Where the outer unit (2) is essentially a rectangular hollow section including a first and second outer unit face (11,12) and a first and second outer unit side (13,14). The outer unit faces and sides (11,12,13,14) are the walls of the outer unit (2) that surround the outer unit interior (15) which is the void within the outer unit (2). The first and second outer unit faces (11,12) are opposite walls of the outer unit separated by and coterminous with both outer unit sides (13,14).

The inlet (6) is a conduit for wood to be processed to move into the outer unit interior (15), in this first variant the inlet (6) is shown as an essentially circular pipe extending away from the first outer unit face (11). The outlet (7) is a conduit that allows the processed timber to move out of the outer unit interior (15) and exit the wood processing device (1), in this first variant the outlet (7) is shown as a length of rectangular hollow section (RHS).

In this first variant the second outer unit face (12) includes two support strips (17,18), one coterminous with each of the outer unit sides (13,14). These support strips (17,18), along at least part of their length, are spaced apart across the second outer unit face (12) leaving a outer unit outlet aperture (19) through which the outlet (7) extends. In this first embodiment the outer unit outlet aperture (19) extends the full length of the second face (12), in other embodiments the support strips (17,18) may extend only a portion of the length of the second outer unit face (12) forming a outer unit outlet aperture (19) that extends only a portion of the length of the outer unit (2).

Referring to FIGS. 4 to 8 where necessary the wood processing device (1) is shown with the outer unit cross-sectioned to reveal the cutting unit (3) including a cutting blade (20), a cutting unit base (22), two cutting unit sides (24,25) and a cutting unit end wall (26) inside the outer unit interior (15). The cutting blade (20) lies immediately adjacent the first outer unit face (11), the cutting unit base (22) lies immediately adjacent the second outer unit face (12)

The cutting blade (20) and cutting unit base (22) are opposite faces of the cutting unit (3) separated by, and coterminous with, both of the cutting unit sides (24,25). The cutting unit end wall (26) is coterminous with the cutting blade (20), cutting unit base (22) and both cutting unit sides (24,25). Viewed in the direction of arrow F the combination of the cutting blade (20), cutting unit base (22) and cutting unit sides (24,25) form a hollow rectangle with the cutting blade (20) adjacent the first outer unit face (11).

The cutting unit base (22) includes a cutting unit aperture (27) that is coterminous with one end of the outlet (7) which extends away from the cutting unit base (22) and outer unit interior (15). The cutting unit aperture (27) combines with the outlet (7) to allow processed wood to exit the wood processing device (1).

The cutting blade (20) is a plate with a ‘V’ shaped cutting blade edge (28) at one end, the blade edge end (29). In plan view, see FIG. 5 or 6, the cutting blade (20) is a concave pentagon with two parallel sides (blade sides (33,34)) with the concave portion forming the cutting edge (28). In this first variant the concave pentagon has a single axis of symmetry parallel to the blade sides (33,34) that passes through the vertex in the concave portion, other variants may have no axis of symmetry.

Figure 4:
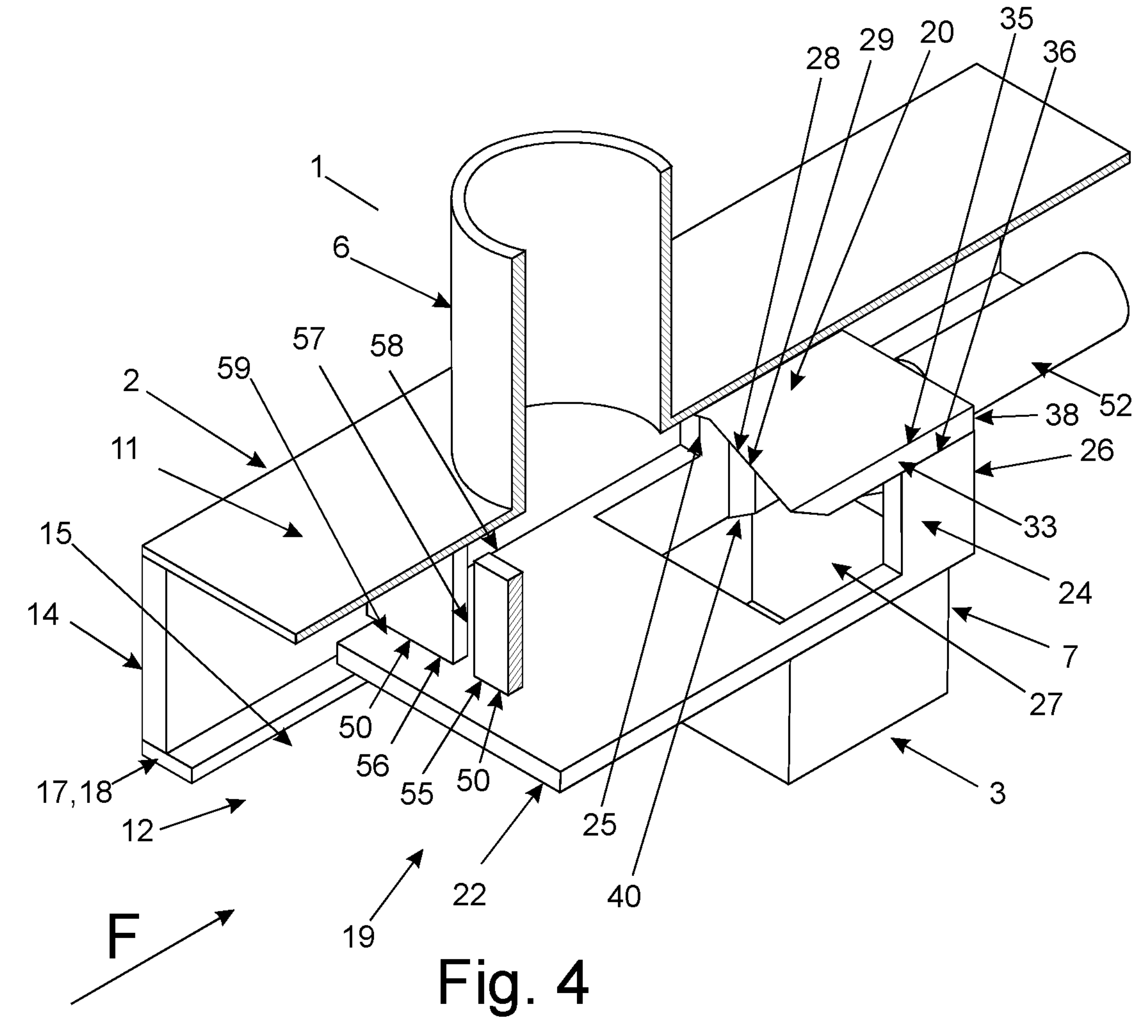
FIG. 4 is an isometric view of the first variant of the wood processing device with the outer unit sectioned along the line D-D.
Figure 5:
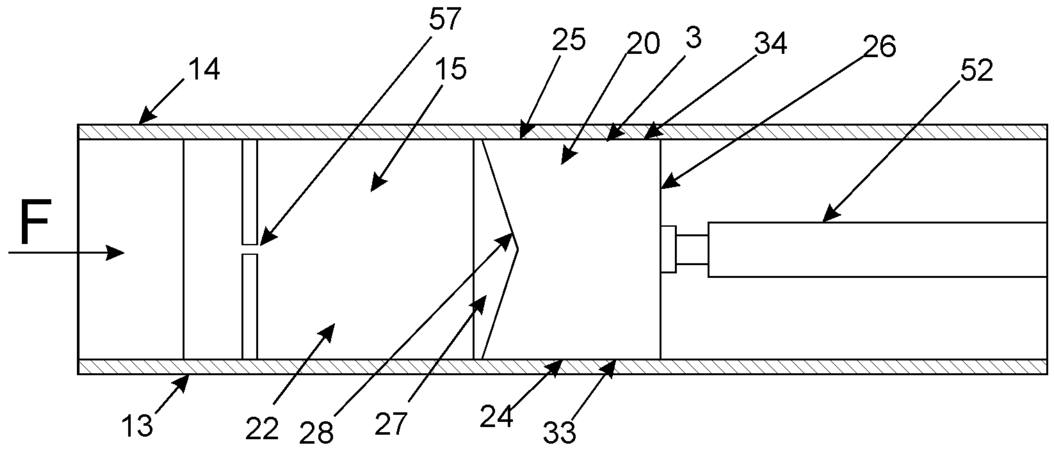
FIG. 5 is a cross-sectional view of the first variant of the wood processing device along the line B-B viewed in the direction of the arrows, the cutting unit is shown in a first position.
Figure 7:
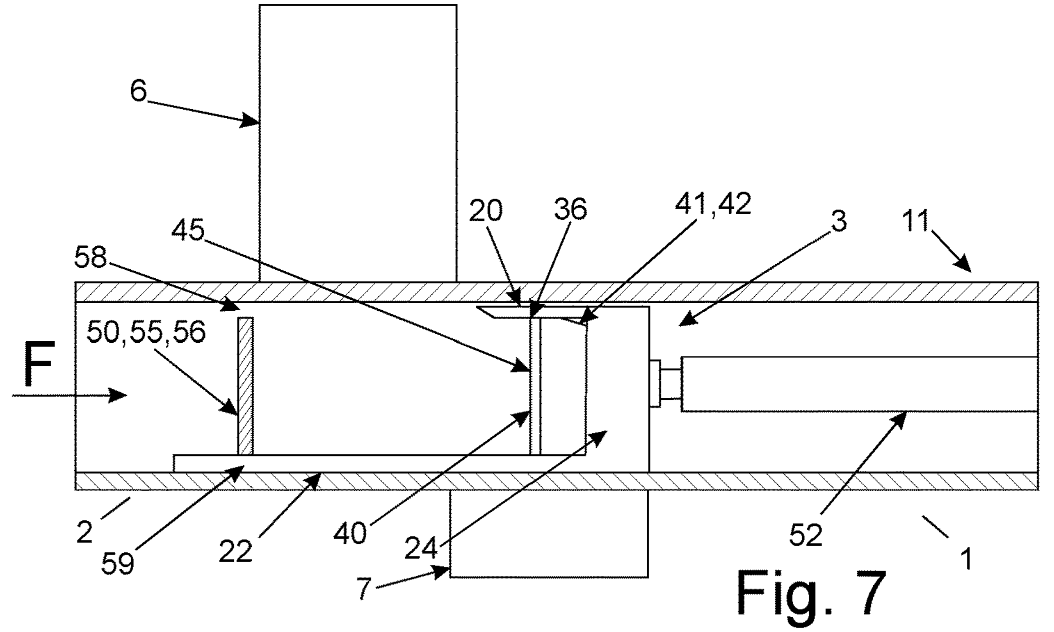
FIG. 7 is a cross-sectional view of the first variant of the wood processing device along the line C-C viewed in the direction of the arrows, the cutting unit is shown in the first position.
Figure 8:
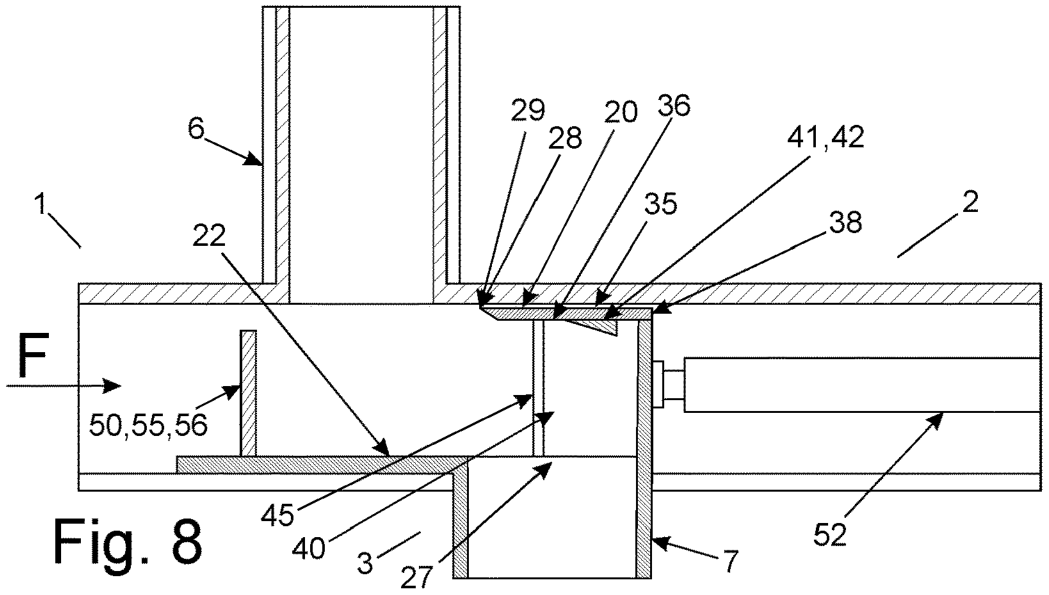
FIG. 8 is a cross-sectional view of the first variant of the wood processing device along the line D-D viewed in the direction of the arrows, the cutting unit is shown in the first position.

As shown in FIGS. 4, 7 and 8 the cross-sectional shape of the cutting blade (20) is trapezium with the two parallel faces, the first and second blade faces (35,36), linked by the blade edge end (29) and a blade end (38). Where the blade edge end (29) and the blade end (38) are opposite ends of the cutting blade (20). The first blade face (35) is the longer of the parallel faces, it is coterminous with the exposed surface of the cutting unit (2) and it lies closest to the first outer unit face (11). The blade end (38) of the cutting blade (20) is coterminous with the cutting unit end wall (26), where the cutting unit end wall (26) is coterminous with the wall of the outlet (7) furthest from the inlet (6). The cutting blade edge (28) and blade end (38) are opposite ends of the cutting blade (20).

Referring to FIGS. 4 to 8 the cutting unit (3) further includes a splitting blade (40) and blade wedges (41,42).

Referring to FIG. 7 or 8, side views, the splitting blade (40) is a flat blade with a splitter edge (45). The splitting blade (40) is coterminous with, and extends away from, the second blade face (36) towards the cutting unit base (22). In plan view, see FIG. 6, the splitting blade (40) is shown as extending along the axis of symmetry of the cutting blade (20) from the cutting unit end wall (26) to a point close to the vertex of the cutting edge (28). The splitter edge (45) is the sharpened edge of the splitting blade (40), and it is the terminal cutting edge of the splitting blade (40) located closest to the cutting blade edge (28).

Figure 6:
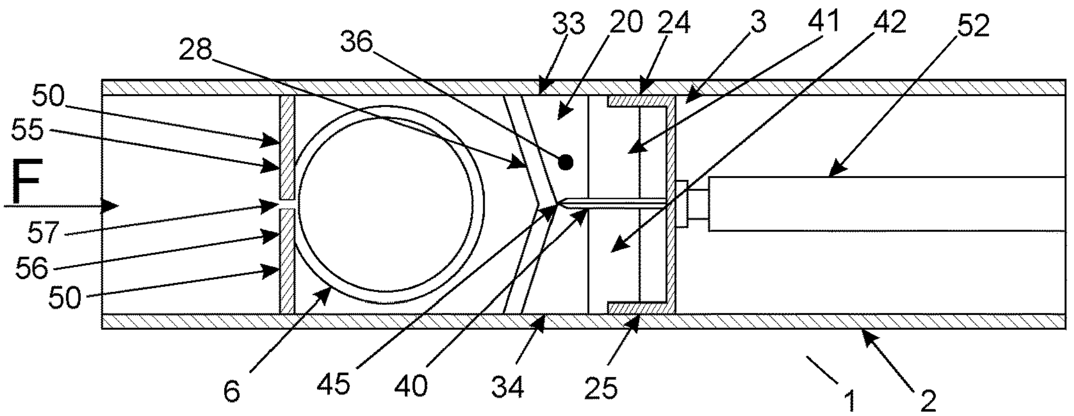
FIG. 6 is a cross-sectional view of the first variant of the wood processing device along the line A-A viewed in the direction of the arrows, the cutting unit is shown in a first position.

Referring to FIGS. 6 to 8 the blade wedges (41,42) are shown extending away from and attached to, or formed as part of, the second blade face (36). In side view (FIG. 7 or 8) the cross section of the blade wedges (41,42) is shown as triangular with the apex furthest from the cutting blade edge (28). In this first variant there are two blade wedges (41,42) separated by the splitting blade (40) (see FIG. 6) that in combination extend across the width of the cutting blade (20). The apex of the cutting wedges (41,42) is between 25 mm and 100 mm from the second blade face (36), though this could be any figure within this range, and it may vary across the width of the cutting blade (20).

Referring to any of FIGS. 4 to 8 where necessary, the wood processing device (1) further includes a stop (50) and a movement device (52).

The stop (50) extends across the width of the outer unit interior (15) between the outer unit sides (13,14) close to or in line with the inlet (6) which, in use acts to prevent any timber being processed moving along the length of the outer unit interior (15) away from the blades (20, 40) during processing. The stop (50) shown in this variant consists of two spaced apart stop sub-sections (55,56), the first stop sub-section (55) and the second stop sub-section (56). The first stop sub-section (55) is coterminous with and extends away from the first outer unit side (13), and the second stop sub-section (56) is coterminous with and extends away from the second outer unit side (12). The space between the two stop sub-sections (55,56) is the splitting space (57). The stop sub-sections (55,56) are spaced apart from the first outer unit face (11) by the blade space (58), and from the support strips (17,18) by the base space (59).

The dimensions of the splitting space (57) are sufficient to allow the splitting blade (40) to pass through the stop (50).

The dimensions of the blade space (58) are sufficient to allow the cutting blade (20) and at least part of the blade wedges (41,42) to pass through the stop (50).

The dimensions of the base space (59) are sufficient to allow the cutting unit base (22) to pass through the stop (50).

Figure 9:
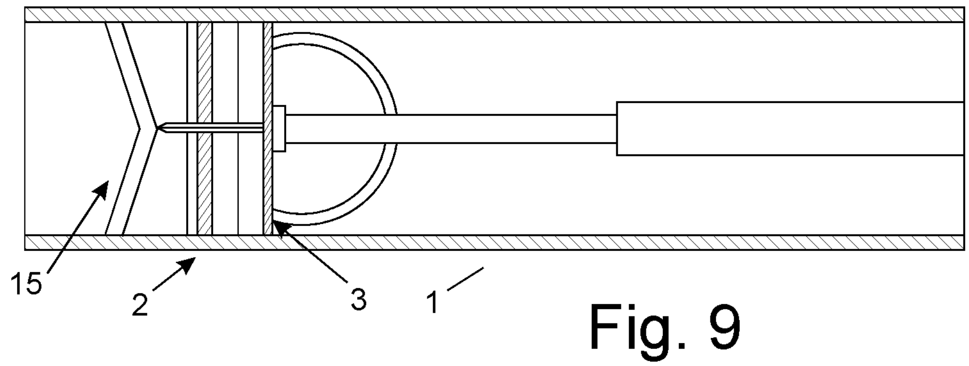
FIG. 9 is a cross-sectional view of the first variant of the wood processing device along the line C-C viewed in the direction of the arrows, the cutting unit is shown in the second position.
Figure 10:
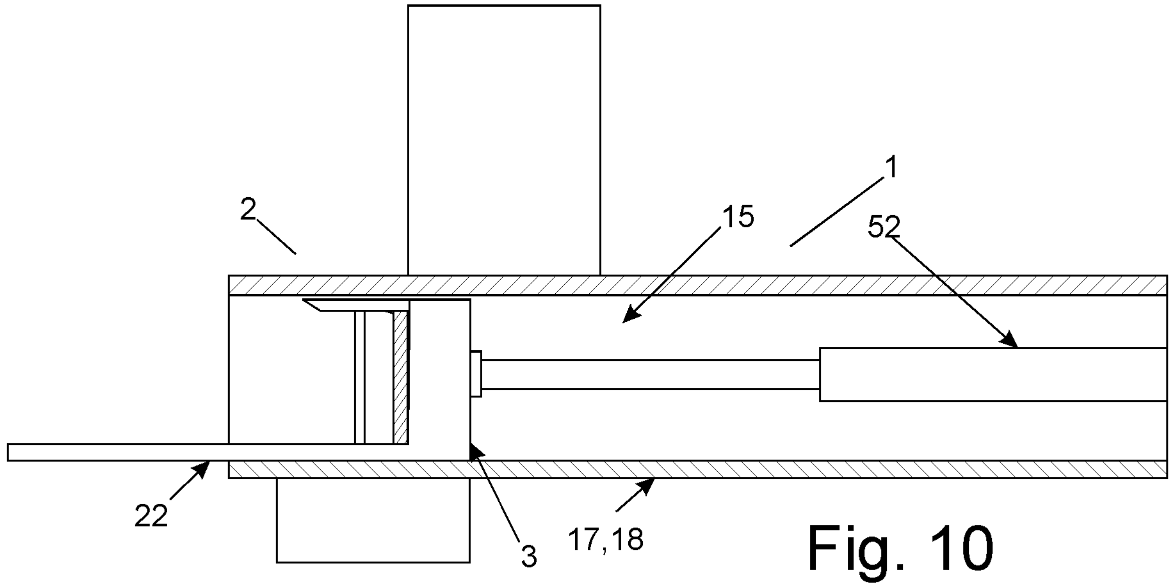
FIG. 10 is a cross-sectional view of the first variant of the wood processing device along the line A-A viewed in the direction of the arrows, the cutting unit is shown in a second position.
Figure 11:
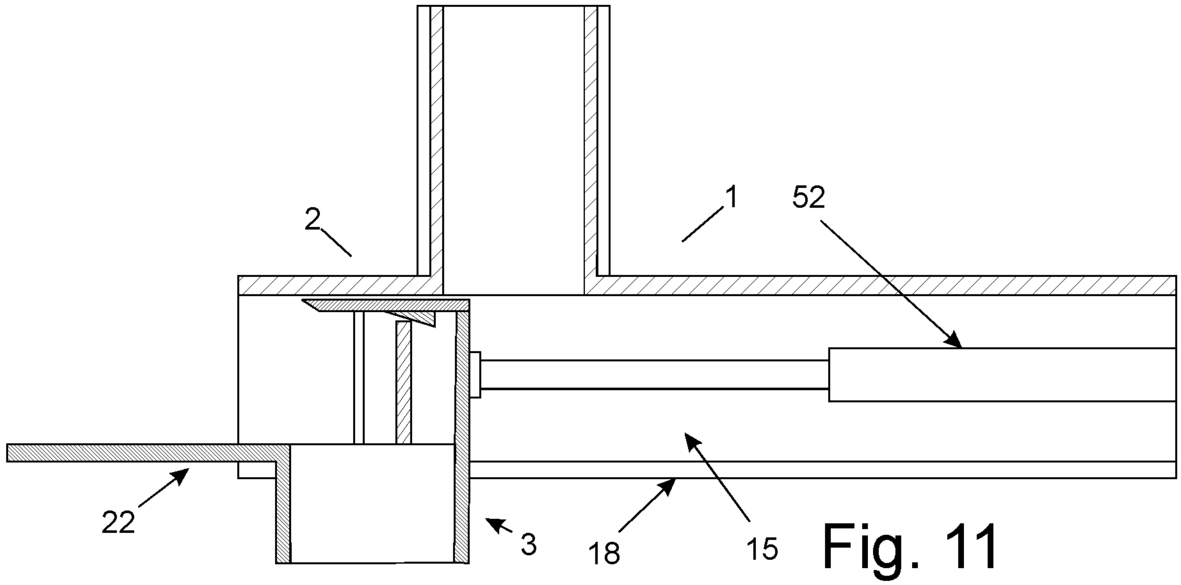
FIG. 11 is a cross-sectional view of the first variant of the wood processing device along the line D-D viewed in the direction of the arrows, the cutting unit is shown in the second position.

The movement device (52) shown is a hydraulic piston attached to the cutting unit wall end (29) allowing the cutting unit (3) to be moved from a first position (shown in FIGS. 4 to 8) to a second position shown in FIGS. 9 to 11. The cutting unit (3) moving along the length of the outer unit (2) within the outer unit interior (15), with the cutting unit base (22) supported by the support strips (17,18). The cutting unit base (22) and support strips (17,18) may be lubricated or include a low friction surface (specific low friction coating, balls or rollers) to minimise wear or incorporate like pole magnets so they are physically separated.

Figure 12:
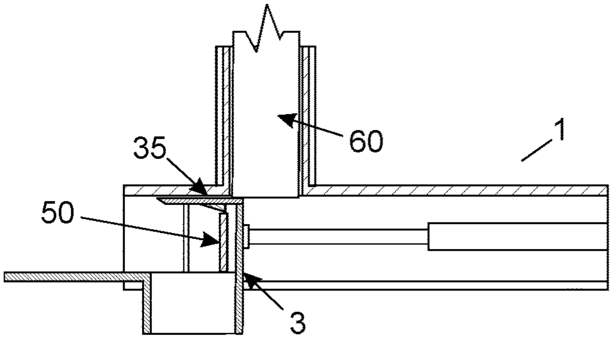
FIG. 12 is a cross-sectional view of the first variant of the wood processing device along the line D-D viewed in the direction of the arrows, the cutting unit is shown in the second position with wood to be processed shown.

Referring to FIGS. 12 to 16 one method of action of the wood processing device (1) is shown with the following steps in order:

Step 1: As shown in FIG. 12 with the cutting unit (3) shown in the second position (FIGS. 4 through 8 show the cutting unit in the first position, and FIGS. 9 through 11 and FIG. 16 also show the cutting unit (3) in the second position), with wood for processing (60) shown resting on the first blade face (35).

Figure 13:
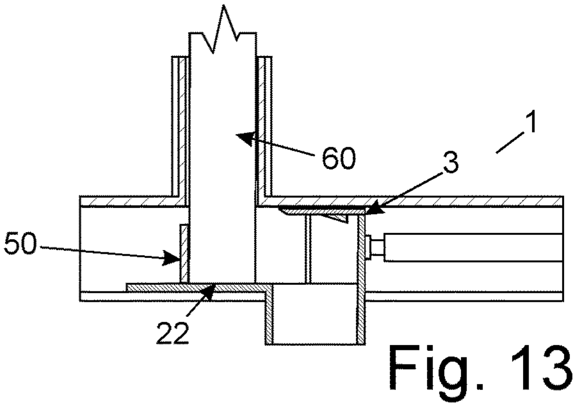
FIG. 13 is a cross-sectional view of the first variant of the wood processing device along the line D-D viewed in the direction of the arrows, the cutting unit is shown in the first position with wood being processed shown, after having moved from the second position to the first position.
Figure 14:
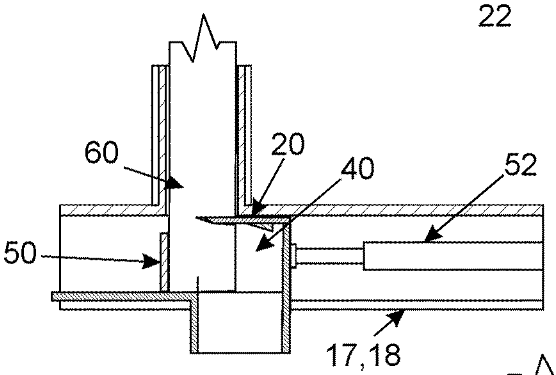
FIG. 14 is a cross-sectional view of the first variant of the wood processing device along the line D-D viewed in the direction of the arrows, the cutting unit is shown in an intermediate position between the first position and the second position with wood being processed shown and moving from the first position to the second position.
Figure 15:
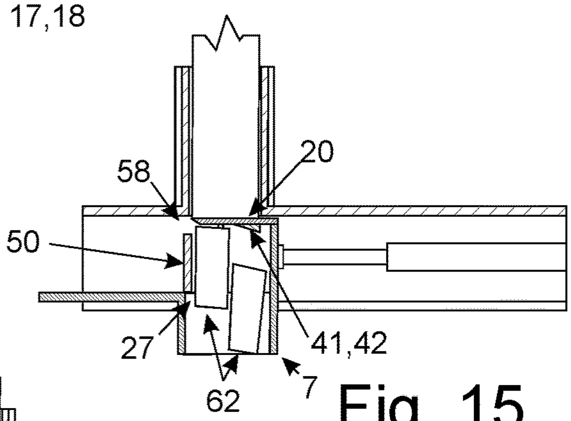
FIG. 15 is a cross-sectional view of the first variant of the wood processing device along the line D-D viewed in the direction of the arrows, the cutting unit is shown in an intermediate position between the intermediate position shown in FIG. 14 and the second position with wood being processed shown and moving in the direction of the second position.
Figure 16:
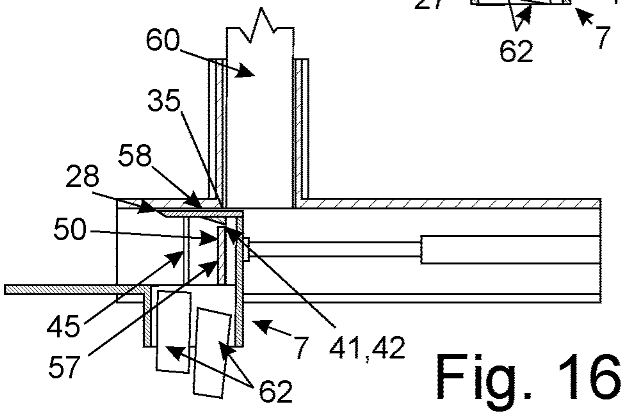
FIG. 16 is a cross-sectional view of the first variant of the wood processing device along the line D-D viewed in the direction of the arrows, the cutting unit is shown in the second position after processing wood.
Figure 17:
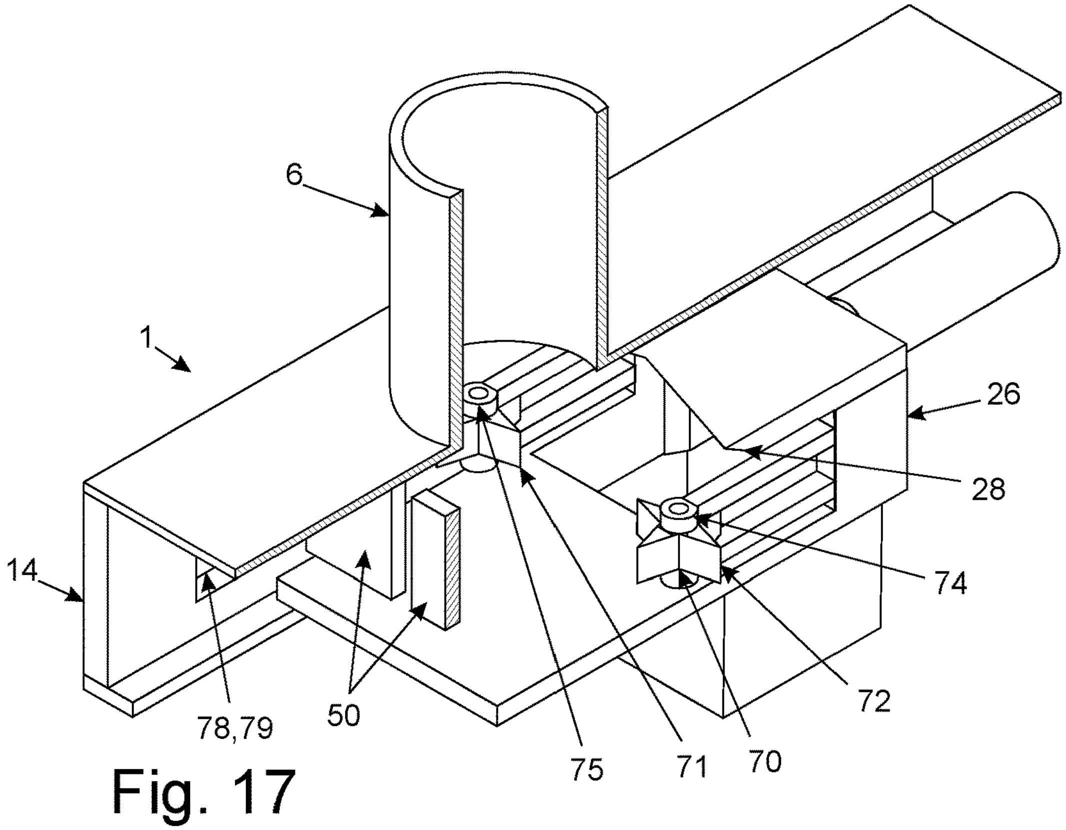
FIG. 17 is an isometric view of a second variant with the outer unit and inlet in cross-section.
Figure 18:
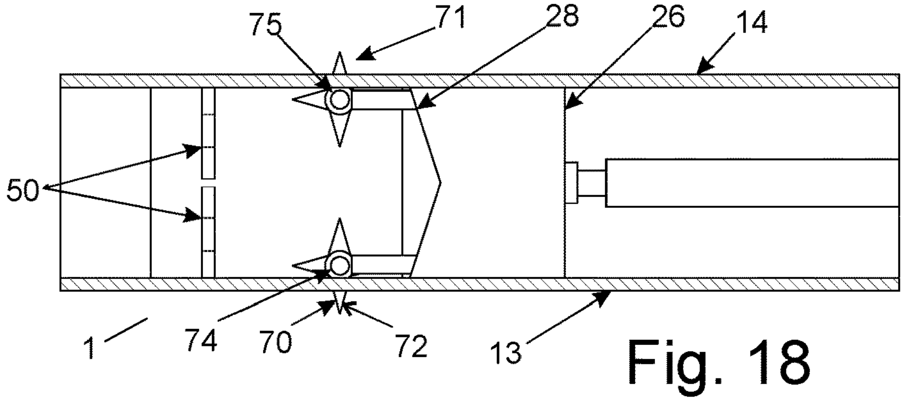
FIG. 18 is a cross-sectional view of the second variant of the wood processing device along the line B-B viewed in the direction of the arrows, shown in a first position.
Figure 19:
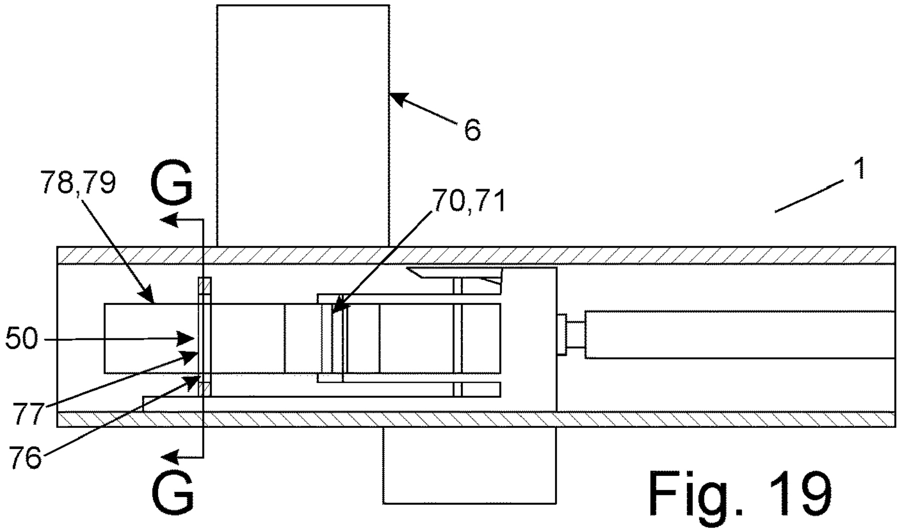
FIG. 19 is a cross-sectional view of the second variant of the wood processing device along the line C-C viewed in the direction of the arrows, the cutting unit is not cross sectioned and it is shown in the first position.
Figure 20:
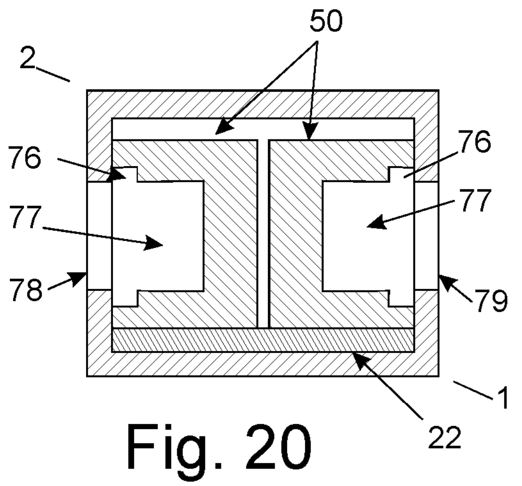
FIG. 20 is a cross sectional view of the second variant shown in FIG. 19 along the line G-G in the direction of the arrows.

Step 2: As shown in FIG. 13 the cutting unit (3) has been moved from the second position to the first position allowing the terminal end, or ends, of the wood for processing (60) to drop onto the cutting unit base (22);

Step 3: As shown in FIG. 14 the cutting unit (3) has been moved along the support strips (17,18) by the movement device (52) forcing the cutting blade (20) and splitting blade (40) into the wood for processing (60), this start cutting the wood for processing (60) to the desired length whilst start to longitudinally split the wood for processing (60);

Step 4: As shown in FIG. 15 the cutting blade (20) has been pushed through the wood for processing (60) and is starting to pass into the cutting space (58) and the blade wedges (41,42) have split of a piece of processed wood (62) by forcing it through the cutting unit aperture (27) and into the outlet (7);

Step 5: As shown in FIG. 16 the cutting blade edge (28) and at least a proportion of the blade wedges (41,42) have passed through the cutting space (58) and the splitter edge (45) has passed through the splitting space (57) with the pieces of processed wood (62) moving through the outlet (7), and the remaining length of the wood for processing (60) rests on the first blade face (35) ready for step 2.

In steps 3 to 5 the stop (50) prevents the wood for processing wood (60) from moving with the cutting unit (3) once the cutting blade edge (28) has passed through the entire thickness of the wood for processing (60).

Second Variant of the Invention

Referring to FIGS. 17 to 20 a second variant of the wood processing device (1) is shown. In this variant includes a pair of splitting wheels (70,71) which are essentially spur gears with a small root diameter, a vertex rather than a flat at the end of each tooth (72) and 4 to 10 teeth. Each splitting wheel (70,71) rotates around a splitting pin (74,75) (an axle) which is attached to a portion of the associated cutting unit side (24,25). There is one splitting wheel (70,71) attached to each cutting unit side (24,25). The centreline of each splitting pin (74,75) is parallel to the centreline of the inlet (6).

The distance between the cutting unit end wall (26) and the cutting blade edge (28) is less than the distance between each splitting pin (74,75) and the cutting unit end wall (26) as such, in use, the splitting wheels (70,71) pass through a portion of the stop (50) before the cutting blade edge (28). In this configuration the stop (50) includes pin and wheel spaces (76,77) dimensioned to accept the splitting pins (74,75) and splitting wheels (70,71) respectively. In addition the outer unit sides (13,14) include splitting apertures (78, 79) which are apertures in the outer unit sides (13,14) dimensioned to accept the splitting wheels (70,71).

Figure 21:
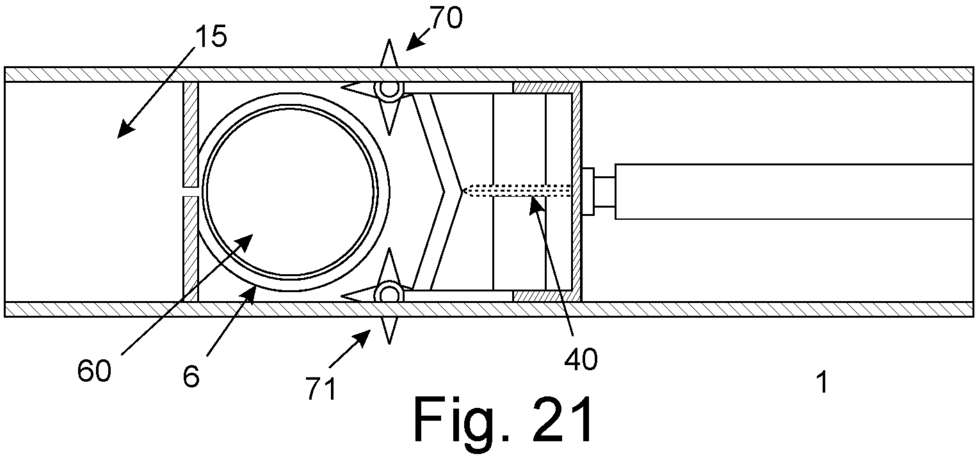
FIG. 21 is a cross-sectional view of the second variant of the wood processing device along the line A-A viewed in the direction of the arrows, the cutting unit is shown in a first position.

Referring to FIG. 21 an alternate embodiment of the second variant is shown in the first position. In this embodiment, in the first position, the splitting wheels (70,71) are located such that they do not touch or impede wood for processing (60) moving through the inlet (6) to the outer unit interior (15). The splitting blade (40) is shown in dashed lines as this may not always be present.

Third Variant of the Invention

Figure 24:
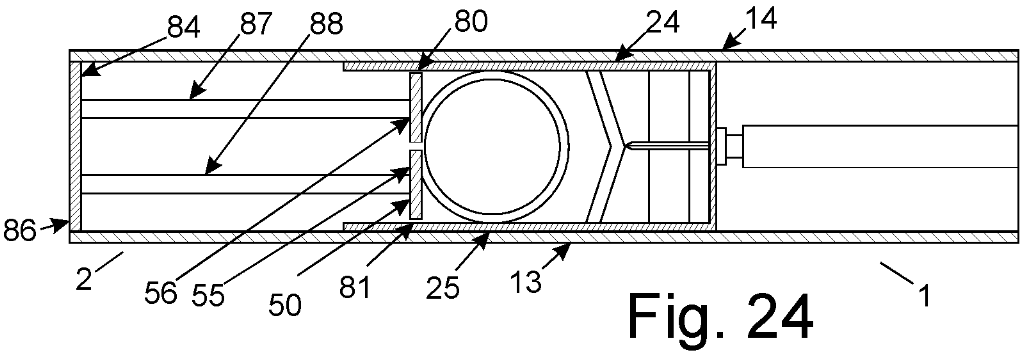
FIG. 24 is a cross-sectional view of the third variant of the wood processing device along the line A-A viewed in the direction of the arrows, the cutting unit is shown in a first position.
Figure 25:
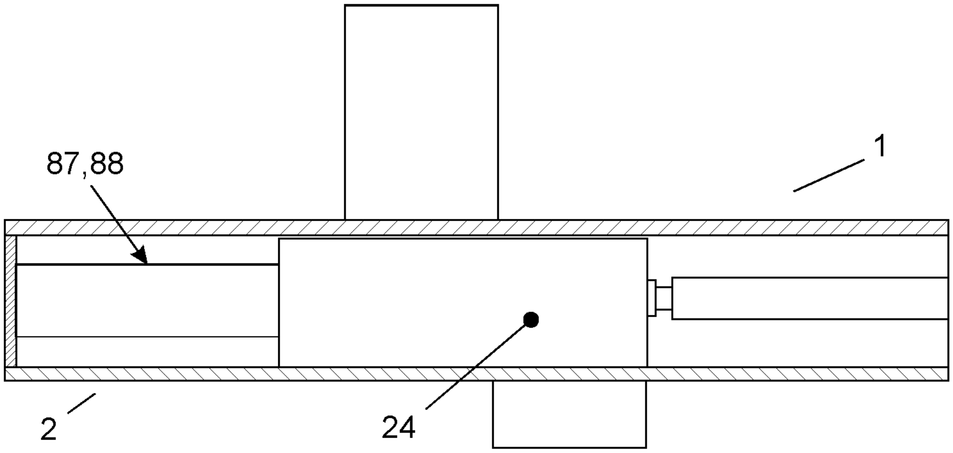
FIG. 25 is a cross-sectional view of the third variant of the wood processing device along the line C-C viewed in the direction of the arrows, the cutting unit is shown in the first position.

Referring to FIGS. 24 and 25 a third variant of the wood processing device (1) is shown. In this variant the cutting unit sides (24,25) extend the length of the cutting unit (3). In this variant the stop (50) includes a side space (80,81) which is a void between the stop (50) and the immediately adjacent outer unit side (13,14) dimensioned to allow the cutting unit side (24,25) to pass through the stop (50). As this means that the stop is now not able to be directly attached or formed into the outer unit (2) a outer unit end wall (84), in this case shown as coterminous with the first terminal end of the outer unit (86). Extending from the outer unit end wall (84) are stop supports (87,88). Each stop support (87,88) is an elongate member coterminous with the outer unit end wall (84) and at least one of the stop sub-sections (55,56).

Figure 22:
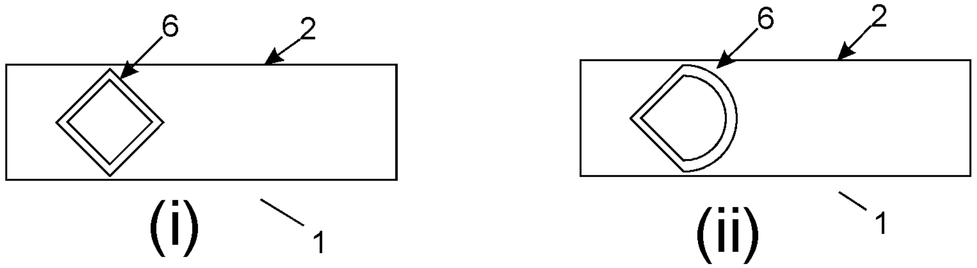
FIG. 22 is a plan view of the wood processing device with two alternative cross-sectional shapes for the inlet, shown as (i) and (ii)

Referring to FIG. 22 the outer unit (2) in plan view with a number of variants of the inlet (6) are shown. Each of these variants has a different inlet (6) cross section.

Variant (i) The inlet has a diamond shape;

Variant (ii) The inlet is the combination of a diamond and a circle, or other curve;

It is felt these shapes will improve the operation of the wood processing device (1) as the diameter, or cross-sectional size, of the or each piece of wood being processed decreases. The cutting blade (6) (see FIG. 4 or 14 for example) will move the wood for processing (60) into the corner of the diamond section.

Figure 23:
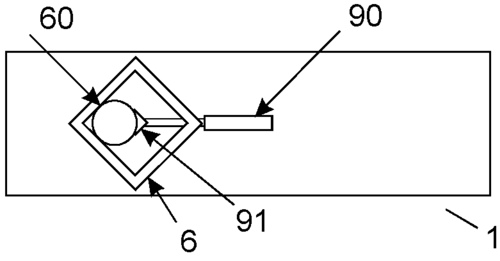
FIG. 23 is a plan view of an embodiment of the wood processing device that incorporates a nudging piston.

Referring to FIG. 23 the inlet (6) is shown with a nudging piston (90) which is a hydraulic piston with a nudge bar (91), where the nudge bar (91) is a length of angle bar (a bar that has an L' shaped cross section) attached. The nudging piston (90) pushes against the wood for processing (60) pushing it against the wall of the inlet which it is believed will improve the processing of smaller cross-section, or multiple pieces of, wood for processing (60).

Figure 26:
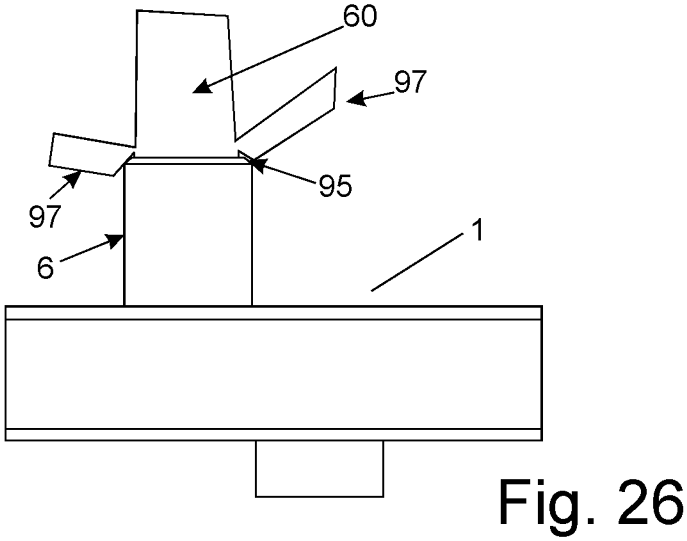
FIG. 26 is a side view of a further embodiment of the wood processing device that includes a trimmer.

Referring to FIG. 26 a variant of the wood processing device (1) where the inlet (6) includes a trimmer (95) is shown, in this variant the trimmer (95) is a sharpened edge coterminous with the exposed terminal end of the inlet (6), this trimmer (95), in use, removes branches (97) from wood for processing (60) as it is inserted into the inlet (6)

Figure 27:
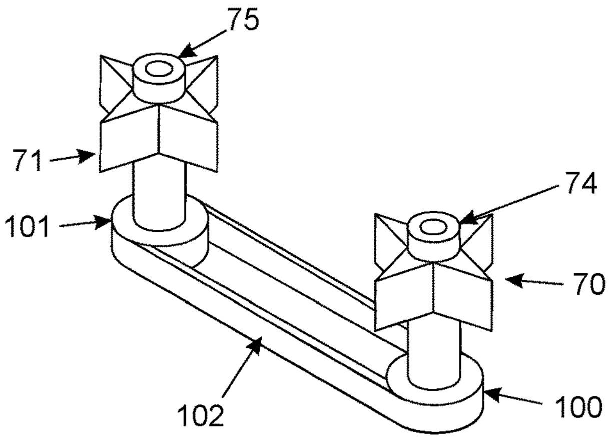
FIG. 27 is an isometric view of the splitting wheels separated from the wood processing device in the correct positions linked by a chain.
Figure 28:
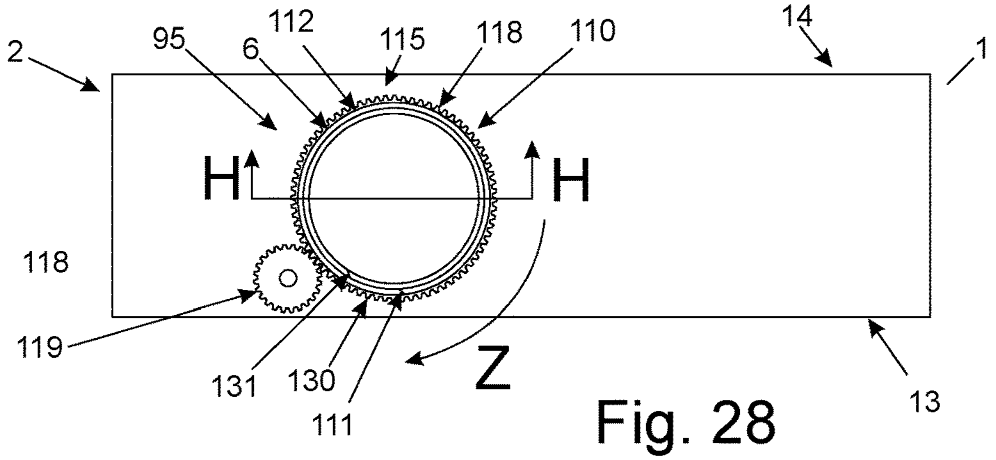
FIG. 28 is a plan view of the fourth variant of the wood processing device.

Some variants include a device to rotate the splitting wheels (70,71) in unison, for example:

- Pin gears (100,101) attached to each splitting pin (74,75) that are linked by a chain (102) (see FIG. 27);
- A rack attached to each outer unit side (13,14) that engages with a pinion gear on each splitting pin (74,75) (this variant is not shown); and
- A rack attached to only one outer unit side (13,14) with pin gears and a chain transferring the rotation of one splitting wheel (70,71) to the other (not shown).

Fourth Variant of the Invention

Referring to FIGS. 28 to 31 a Fourth Variant of the wood processing device (1) including a variant of the trimmer (95) is shown. In this fourth variant the inlet (6) is circular in cross-section and the trimmer (95) includes a primary trimming section (110) with a primary trimming blade (111). The primary trimming section (110) is a section of tube that has an internal diameter that is a clearance fit (close or otherwise) over a section, (the primary engagement section (112)—see FIG. 30 or 31) of the inlet (6).

The primary trimming section (110) has two terminal ends, a primary end (115) and a secondary end (116). The primary end (115) is adjacent the exposed terminal end of the inlet (6) and it includes a primary trimming blade (111). The secondary end (116) is the terminal end of the primary trimming section (110) closest to the first outer unit face (11).

The primary trimming section (110) includes a primary drive gear (118) which is a circumferential ring gear attached to or formed as part of the primary trimming section (110) located close to or immediately adjacent the secondary end (116). The primary drive gear (118) is engaged with a secondary drive gear (119) which is able to be driven by a drive device (122), in this case the drive device (122) is a motor (electric or hydraulic). In use the drive device (112) rotates the primary trimming section so that the primary trimming blade (111) moves around the circumference of the inlet (6).

Figure 29:
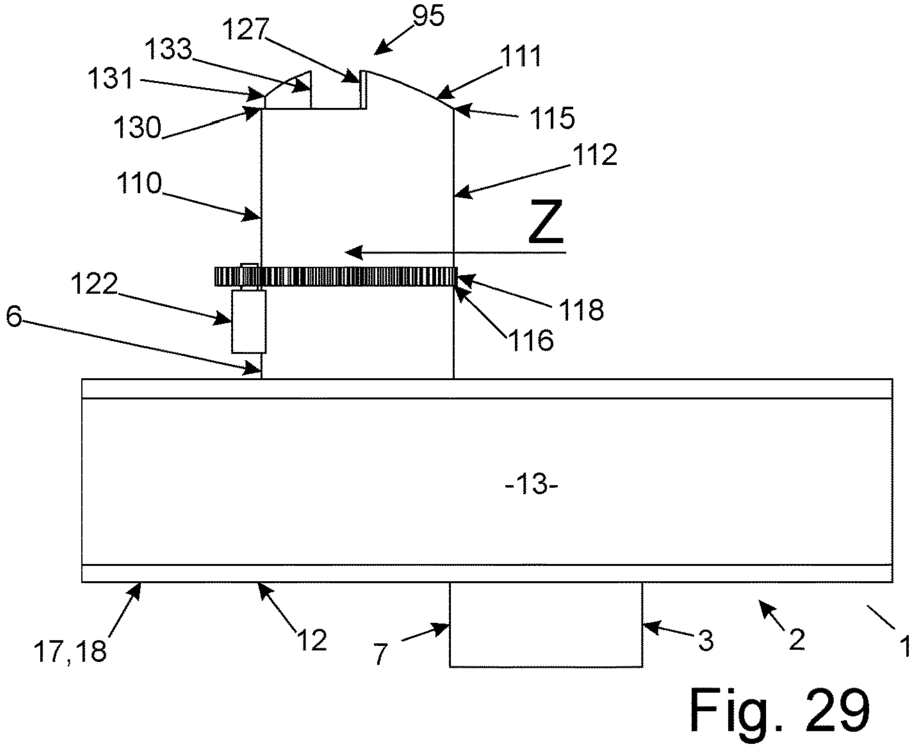
FIG. 29 is a side view of a fourth variant of the wood processing device.

The primary trimming blade (111) is an extension of the primary end (115) which includes a primary trimming blade edge (127). The primary trimming blade edge (127) is aligned so that when in use it leads the primary trimming blade (111) around the circumference of the inlet (6) in the direction of arrow Z. In FIG. 29 the primary trimming blade edge (127) is shown as a straight edge essentially parallel to the longitudinal axis of the inlet (6), it can be angled or curved, most likely concave.

The exposed terminal end of the inlet (6), the primary inlet end (130) includes an inlet trimming blade (131) which is an extension of the inlet (6) that extends away from the primary inlet end (130). The inlet trimming blade (131) includes an inlet trimming blade edge (133) aligned such that, when in use, the drive device (122) moves the primary trimming section (110) with respect to the inlet (6) moving the trimming blade edges (127,133) towards and then past each other.

Figure 30:
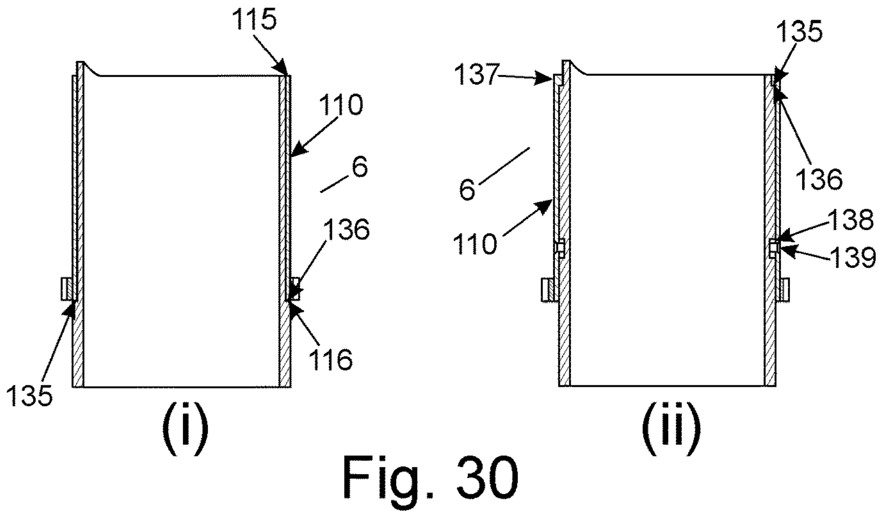
FIG. 30 is two side views of the fourth variant inlet showing two different configurations of the inlet with the primary trimming section in place, (i) and (ii), with the inlet and primary trimming section cross-sectioned along the line H-H in the direction of the arrows.

Referring to FIG. 30 (i) one variation of the inlet (6) with the primary trimming section (110) is shown, in this variation the inlet has a reduced diameter section where it engages with the primary trimming section (110). The inlet (6) in this variation includes an alpha engagement surface (135) which is the surface of the inlet (6) created where the reduced section transitions to the full diameter section of the inlet (6). This alpha engagement surface (135) is immediately adjacent, and in some variations in contact with, the beta engagement surface (136) where the beta engagement surface (136) is coterminous with the secondary end (116). As the beta engagement surface (136) moves across/along the alpha engagement surface (135) it is likely there will be some form of friction reduction between them, this may be any of the following, alone or in combination with any, some or all of the others: —

- One or both engagement surfaces (135,136) is made of or includes a low-friction material;
- the engagement surfaces (135,136) include, are separated by, or are a known form of bearing (ball, roller, etc);
- A lubricant or similar material is present between the engagement surfaces (135,136); and
- The engagement surfaces (135, 136) include, or are made of, magnets that have like poles facing.

Referring to FIG. 30 (ii) a second variation of the inlet (6) with the primary trimming section (110) is shown. In this second variation the outside diameter of the inlet (6) is constant and the alpha engagement surface (135) is coterminous with the exposed terminal end of the inlet (6). In this second variation the primary trimming section (110) includes an inlet engagement section (137) which is a section of the primary trimming section (110) that is coterminous with the primary end (115). The inlet engagement section (137) has a reduced internal diameter and it extends partially along the length of the primary trimming section (110). In this second variation the engagement section (137) includes the beta engagement surface (136) which is immediately adjacent the alpha engagement surface (135).

This second variation of the fourth variant may incorporate a trimming groove (138) the inlet (6). The trimming groove (138) is a circumferential channel in the outer wall of the inlet (6) that is covered by the primary trimming section (110). This trimming groove (138) is present to engage with retention devices (139) (pins, bolts, screws, set screws, keys, spring loaded balls, etc) to minimise or eliminate differential longitudinal movement between the primary trimming section (135) and the inlet (6). The retention devices (139) are dimensioned and/or configured to freely move along the trimming groove (138) allowing the primary trimming section (110) to move circumferentially around the inlet (6).

Figure 31:
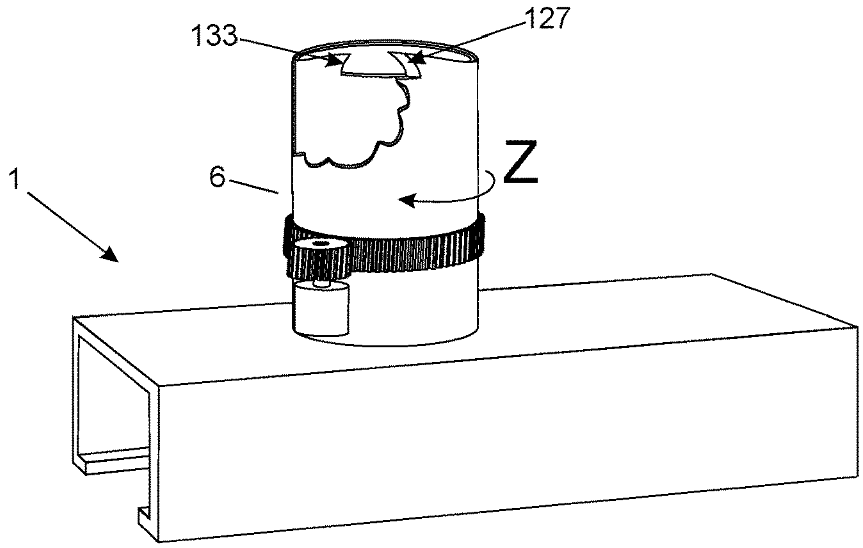
FIG. 31 is a pictorial view of the fourth variant with the primary trimming section partially cross-sectioned.

Referring to FIG. 31 a pictorial view of the wood processing device (1) is shown with the trimming edges (127, 133) both being concave curves.

Referring to FIG. 29, where the inlet (6) is not essentially circular in cross-section, the trimming blades (111,131) are configured so that the primary trimming blade (111) moves along a maximum diameter inscribed circle so that it can remove any branches or other protuberances on the wood to be processed (not shown) that extend outside of this inscribed circle.

Figure 32:
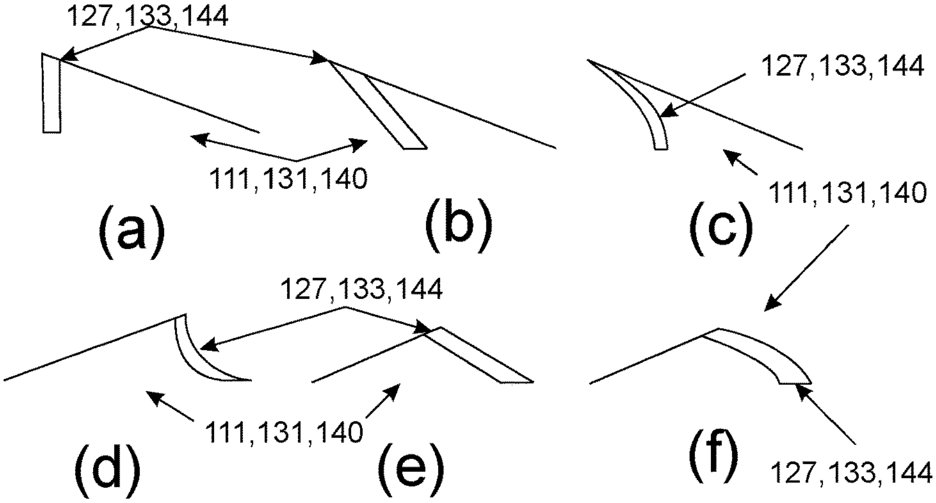
FIG. 32 is a number of side views, (a) to (f), of blade edge profiles.

Referring to FIG. 32 (*a*) to (*f*) some examples of the trimming blade edge (127,133) are shown, the same edge profile does not need to be used for both trimming blades (117,131):

FIG. 32(*a*) straight trimming blade edge (127,133),

FIG. 32(*b*) straight trimming blade edge (127,133), concave;

FIG. 32(*c*) similar to 31(*b*) with curved trimming blade edge (127,133);

FIG. 32(*d*) similar to 31(*c*) with the trimming blade edge (127,133) commencing before apex of blade;

FIG. 32(*e*) straight trimming blade edge (127,133) convex, trimming blade edge (127,133) commencing before apex; and FIG. 32(*f*) similar to 31(*e*) with a convex curved trimming blade edge (127,133).

Noting that these are examples only.

Fifth Variant of the Invention

Figure 33:
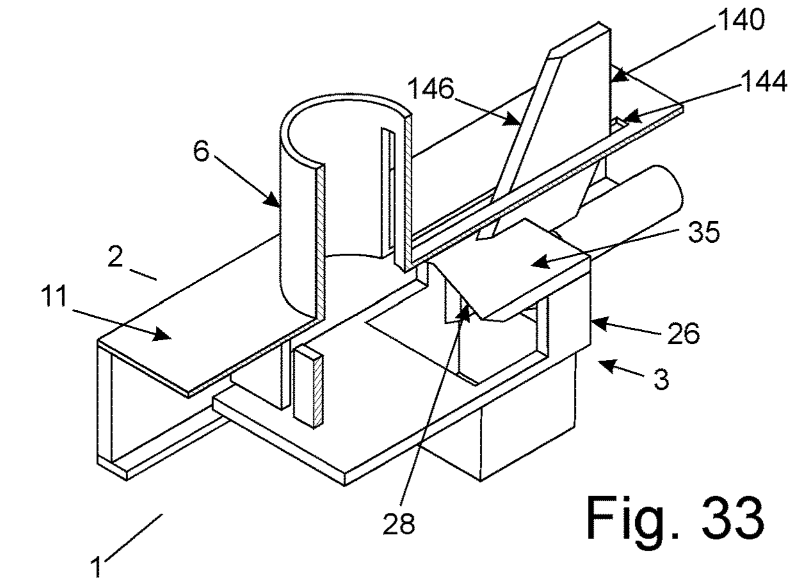
FIG. 33 is a cross-sectional view of a fifth variant of the wood processing device along the line A-A viewed in the direction of the arrows, the cutting unit is shown in a first position.
Figure 34:
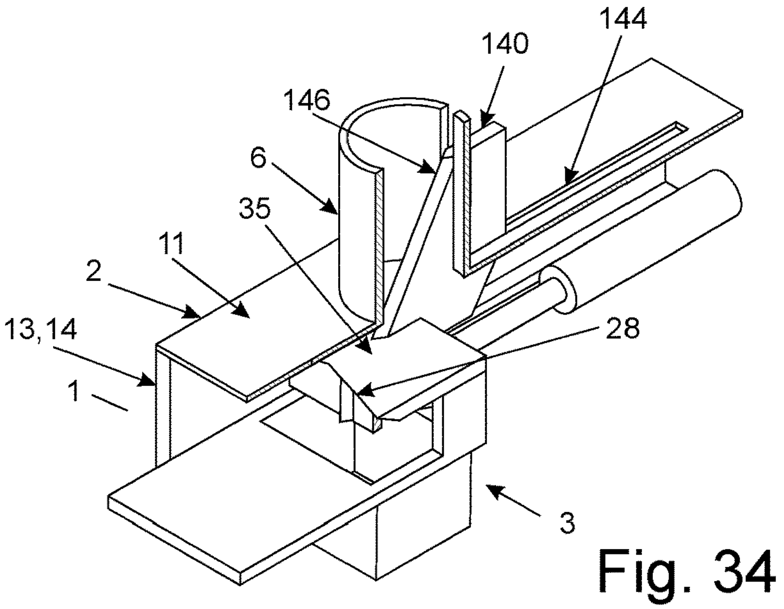
FIG. 34 is a cross-sectional view of the fifth variant of the wood processing device along the line A-A viewed in the direction of the arrows, the cutting unit is shown in a second position.

Referring to FIGS. 33 and 34 a fifth variant of the wood processing device (1) which includes a cut-off blade (140) and a cut-off aperture (144) through the first outer unit face (11) and inlet (6) is shown. The cut-off blade (140) is present to allow the initial cutting of trees and or trimming wood to length, to do this the wood processing unit (1) is rotated such that one of the outer unit sides (13,14) is uppermost (see FIGS. 35-37)

The cut-off aperture (144) is a longitudinally aligned slot through the outer unit (2) that extends along a portion of the first outer unit face (11) and through at least a portion of the inlet (6) which allows the cut-off blade (140) to move along part of the length of the wood processing device (1).

The cut-off blade (140) is attached to or formed as part of the cutting unit (3), extending away from the first blade face (35). The cut-off blade (140) is attached to or formed as part of either the first blade face (35) and the cutting unit end wall (26), or both, so that it moves in unison with the cutting unit (3).

The cut-off blade (140) is a flat blade including a cut-off blade edge (146) which lies on a plane parallel to the longitudinal axis of the cutting unit (3). The cut-off blade edge (146) is the cutting edge of the cut-off blade (140), in FIGS. 33 and 34 this edge is shown as straight, but it may have any of the profiles shown in FIGS. 32(*a*) to 32(*f*). The cut-off blade edge (146) is the edge of the cut-off blade (140) that lies closest to the cutting blade edge (28).

In FIG. 33 the cut-off blade (140) is shown in the pre-cut-off position and in FIG. 34 the cut-off blade (140) is shown in the cut-off position, in the cut-off position a portion of the cut-off blade (140) extends through the cut-off aperture (144) into the interior of the inlet (6), this may not always be the case as the cut-off blade edge (146) may be straight or curved and can be essentially parallel to the outlet (6) or angled.

Figure 35:
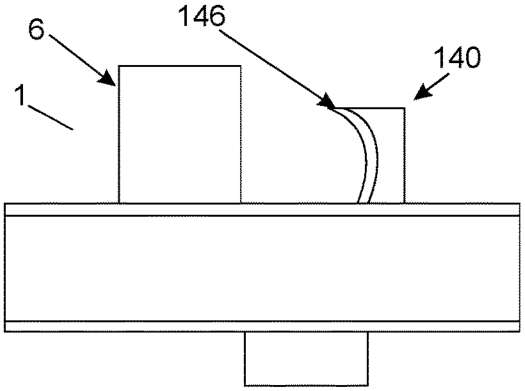
FIG. 35 is a plan view of the fifth variant of the wood processing device with a curved cut-off blade edge.

Referring to FIG. 35 a plan view of the fifth variant of the wood processing device (1) is shown with a concave cut-off blade edge (146) which in use is expected to prevent the wood to be cut from simply moving along the inlet (6) away from the cut-off blade during use.

Figure 36:
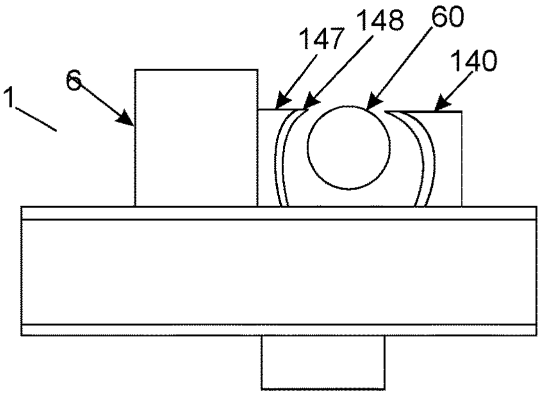
FIG. 36 is a plan view of the fifth variant of the wood processing device with a cut-off fixed blade.

Referring to FIG. 36 a plan view of a variation of the fifth variant of the wood processing device (1) is shown. In this variation the cut-off blade (140) is similar to that shown in FIG. 35, however it includes a fixed cut-off blade (147) including a fixed cut-off blade edge (148) attached to the inlet (6) and/or the first outer unit face (12). The fixed cut-off blade edge (148) is the cutting edge of the fixed cut-off blade (147) and it faces the cut-off blade edge (146) In this variation there is no cut-off aperture (144) (see FIG. 33 or 34) in the inlet (6). The cut-off blade (140) and fixed cut-off blade (147) are located and dimensioned so that they act co-operatively to cut-off wood for processing (60) between them in a shearing action.

Figure 37:
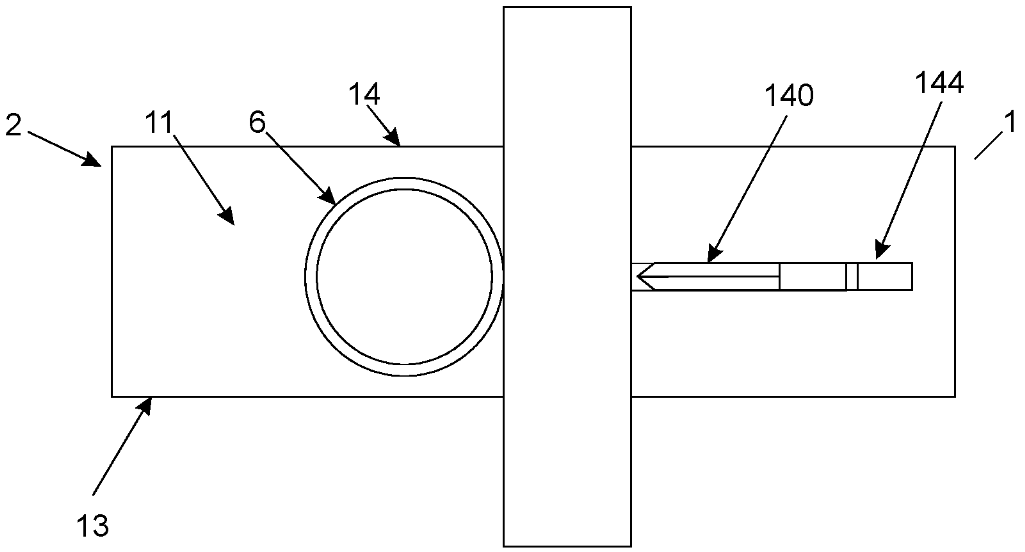
FIG. 37 is a side view of the fifth variant of the wood processing device with a piece of timber ready to be cut.
Figure 38:
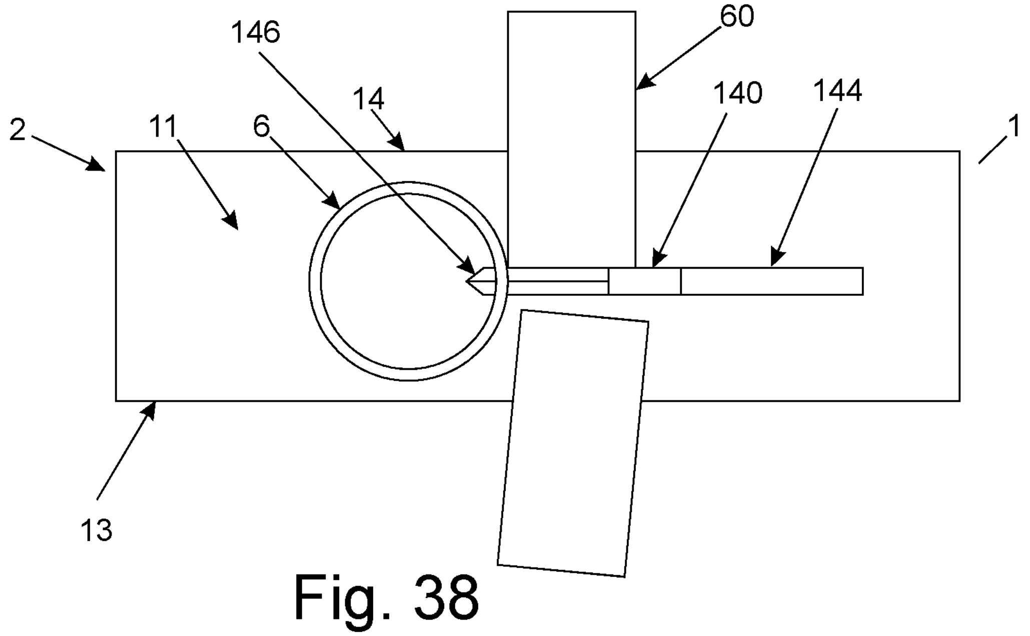
FIG. 38 is the view shown in FIG. 37 with the cut-off blade fully through the wood to be cut.

Referring to FIGS. 37 and 38 the fifth variant of the wood processing device (1) is shown, with the inlet facing towards the viewer, in the first position and second position respectively. In the first position the wood processing device (1) is moved to locate wood for processing (60), a tree to be cut down for example, between the cut-off blade (140) and the inlet (6). The cut-off blade (140) is then moved into the second position cutting through the wood for processing (60) which can then be further processed.

Sixth Variant of the Invention

Figure 39:
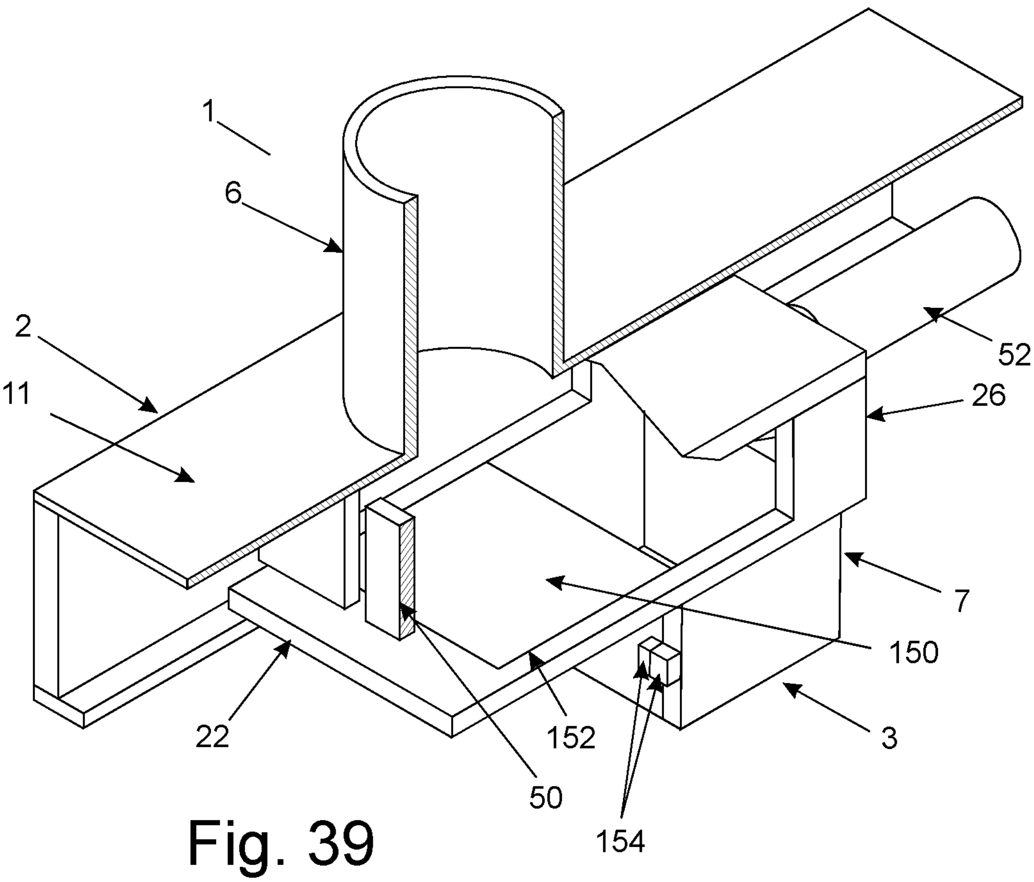
FIG. 39 is an isometric view of a sixth variant with the outer unit and inlet in cross-section
Figure 40:
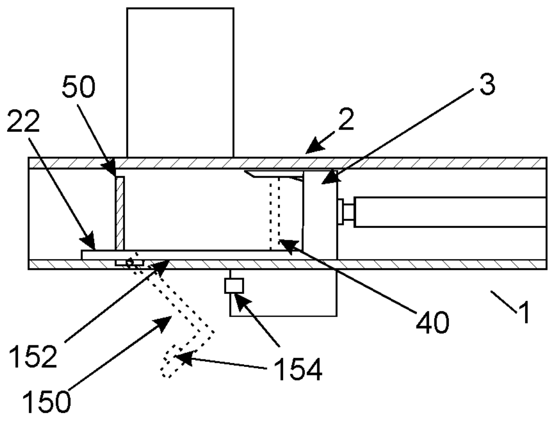
FIG. 40 is a cross-sectional view of the sixth variant of the wood processing device along the line C-C viewed in the direction of the arrows, the cutting unit is shown in the first position.
Figure 41:
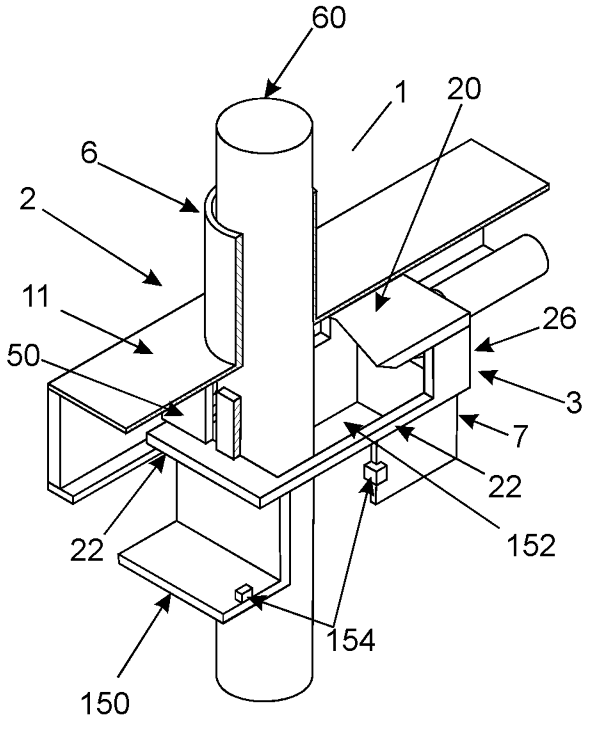
FIG. 41 is a isometric view of the sixth variant shown in FIG. 39 with the pass-through door open and wood extending through the inlet and pass-through aperture.

Referring to FIGS. 39 to 41 a sixth variant of the wood processing device (1) is shown, in this sixth variant the cutting unit (3) includes a pass-through door (150) which is a door in the cutting unit base (22) that is aligned with the inlet (3) when the cutting unit (3) is in the first position.

The pass-through door (150) is a hinged door that fills the pass-through aperture (152) which is an aperture in the cutting unit base (22) that extends from the cutting unit aperture (27) towards the stop (50), in some variations it terminates at the stop (50) in other variations before the stop (50). The pass-through door (150) is hinged so that when it is opened it swings away from the outlet (7).

Referring to FIG. 40 the wood processing device (1) is shown in partial cross-section (similar to FIG. 7) with the pass-through door (150) shown in dashed lines partially open. In this side view the shape of the pass-through door (150) is similar to the number '7' or an inverted L' as it includes a portion of the outlet (7). Where this portion of the outlet (7) is not present then the pass-through door (150) is simply a plate forming part of the cutting unit base (22).

Referring to any of FIGS. 39 to 41 the pass-through door (150) is shown retained in the pass-through aperture (152) by door retainers (154) (though the plural is used it is intended to include the singular), where each door retainer (154) is a retaining device (mechanical latch, magnetic latch, lockable latching device, etc) capable of retaining the pass-through door (150) in the pass-through aperture (152).

Referring to FIG. 41 wood for processing (60) is shown extending through the inlet (6), past the cutting blade (20) and out of the wood processing device (1) via the pass-through aperture (152).

Though the pass-through door (150) is shown and described as a hinged door, it can be simply a removable section of the cutting unit base (22) and/or outlet (7).

In use the fifth variant, when combined with the fourth variant (FIG. 30 or 31) or the variant shown in FIG. 26 the wood (60) (see FIG. 41 for example) is trimmed as it moves into the inlet (6) then when a manageable length (probably between 3 m and 7 m) extends through the pass-through aperture (152) it can be cut off to that length using the cutting blade (20). To avoid splitting the wood for processing (60) during cut-off the sixth variant may not have a splitting blade (40) (see FIG. 6 to 8 for example), or the splitting blade (40) can be removed for the cut-off operation then replaced. In some cases it may be desirable to split the ends of the cut-off sections of wood, as such in FIG. 40 the splitting blade is shown in dashed lines to indicate this is optional. For the same reason, where present for normal operation any splitting wheels (70,71) (see FIG. 21 for example), again these may be removeable items in some variations.

In alternative variations the blade wedges are not simply wedges they have a more complex three-dimensional shape (pyramidal for example) and do not extend across the full width of the cutting blade.

Figure 42:
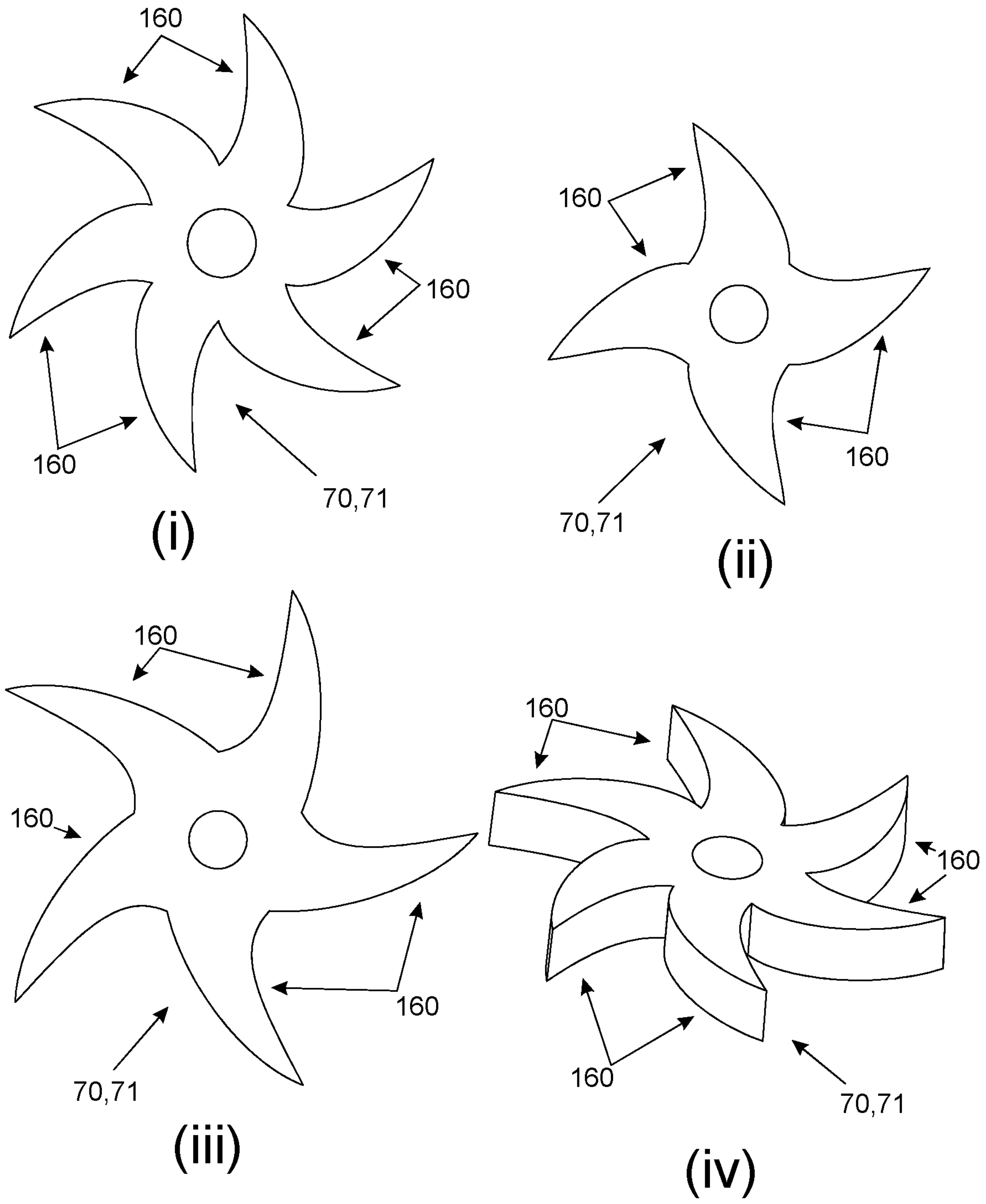
FIG. 42 is a series of views of variations of the splitting wheel, (i), (ii) and (iii) are plan views and (iv) is a pictorial view of the splitting wheel shown in FIG. 42(*i*)

Referring to FIG. 42 various alternate shapes for the splitting wheels (70,71) are shown in plan view. In FIG. 42(i) a six-pointed star with each point, the splitting point (160), on the star is curved is shown, in FIG. 42(ii) there are 4 points each curved, and in FIG. 42(iii) there are 5 points. FIG. 42(iv) shows a pictorial view of the splitting wheel shown in FIG. 42(i) It has been found that forward facing curved splitting points (160) on the splitting blade (70,71) have an improved splitting effect, this is being investigated and additional variations on this curved splitting point (160) may have additional benefits.

Figure 43:
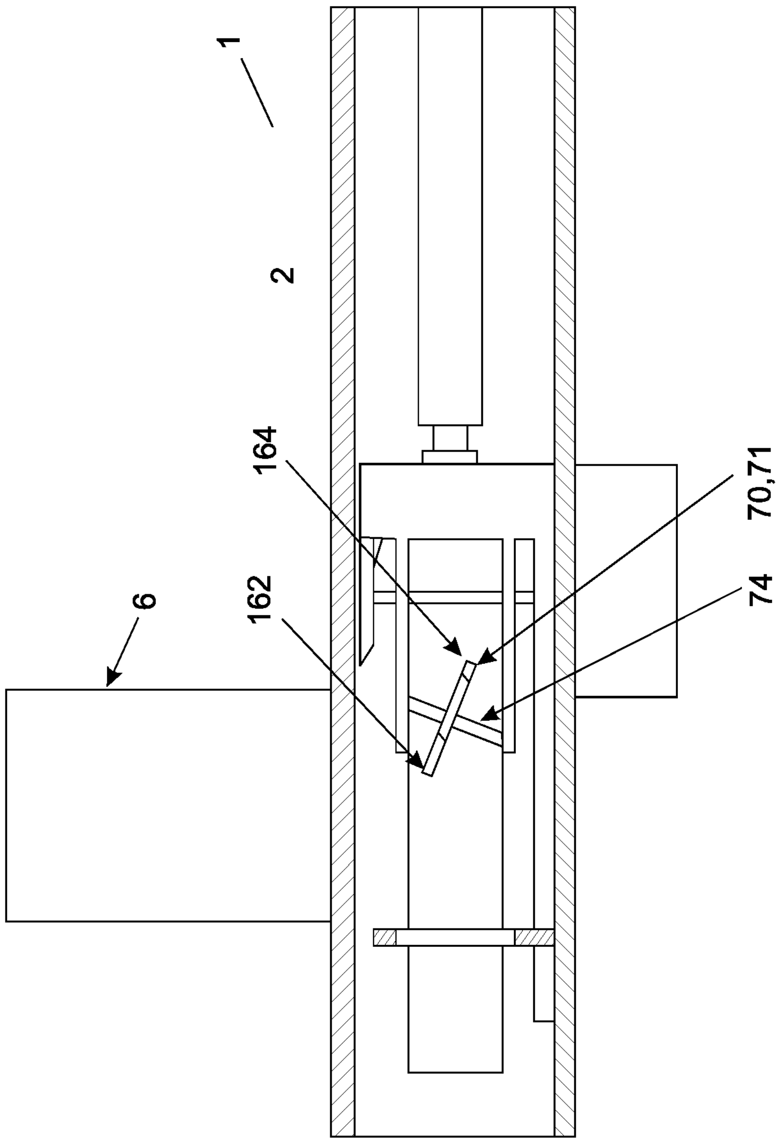
FIG. 43 is a cross-sectional view of the seventh variant of the wood processing device along the line C-C viewed in the direction of the arrows, the cutting unit is not cross sectioned and it is shown in the first position.

Referring to FIG. 43 a seventh variant is shown, in this variant the longitudinal axis of the splitting pins (74,75) is at an angle to the longitudinal axis of the outer unit (2) so that the leading end of the splitting wheels (70,71), the splitting wheel leading end (162), is closer to the first outer unit face (11) than the trailing end of the splitting wheels (70,71), the splitting wheel trailing end (164). The splitting blades (70,71) are preferably those shown in FIG. 42 however they could equally be plain bladed/pointed stars. Elevating the leading edge appears to improve the splitting effectiveness of the splitting blades (70,71).

Certain variants and embodiments can be combined without deviating from the inventive concept and as these are intended to be included even if not directly shown. For example, the one or more features of variants 3, 4, 5 and 6 can be combined with any of the compatible remaining variants as can the features in FIGS. 22 to 25.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Seventh Variant

Figure 44:
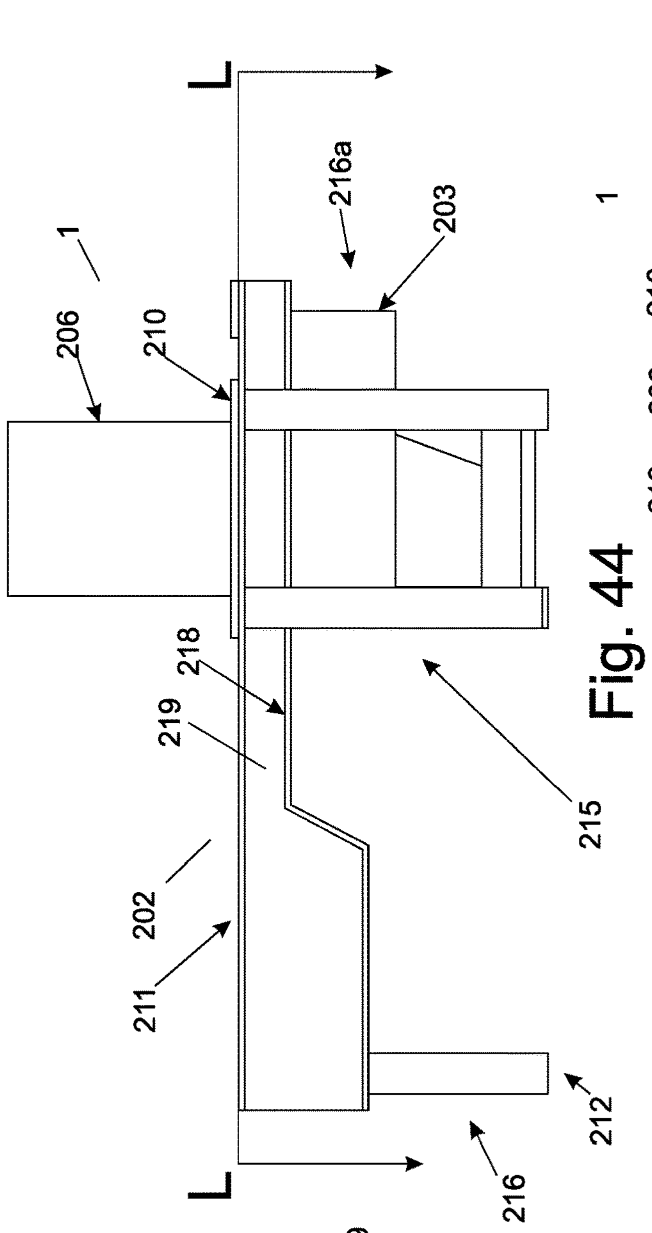
FIG. 44 is a side view of a seventh variant of a wood processing device.
Figure 45:
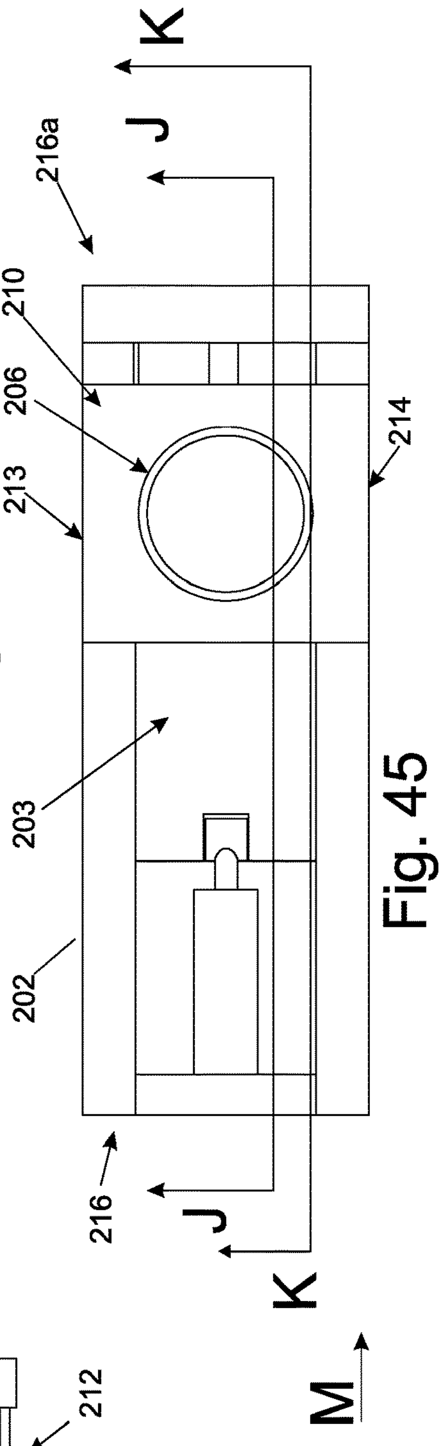
FIG. 45 is a plan view of a seventh variant of the wood processing device shown in FIG. 44.
Figure 46:
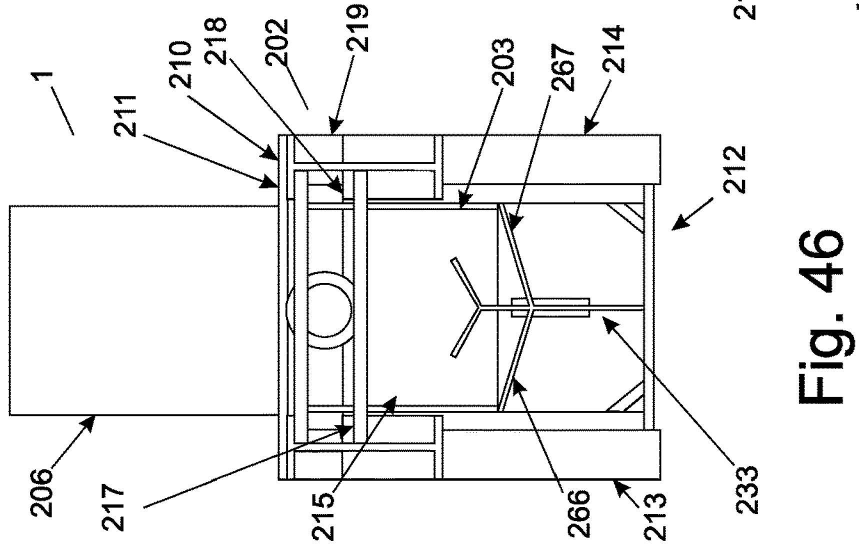
FIG. 46 is an end view of the seventh variant of the wood processing device in the direction of arrow M.

Referring to FIGS. 44 to 46 where necessary a seventh variant of a wood processing device (1) including an outer unit (202) and a cutting unit (203) is shown, with an inlet (206) extending from an inlet plate (210).

The outer unit (202) is essentially a rectangular hollow prism including a first and second outer unit face (211,12), a first and second outer unit side (213,214) and a first and second outer unit end (216,216*a*). The outer unit faces, sides and ends (211,212,213,214,216,216*a*) make up the faces of the outer unit (202) that surround an outer unit interior (215) which is the void within the outer unit (202). The first and second outer unit faces (211,212) are, when in use, the upper and lower faces of the outer unit (202) separated by and coterminous with both outer unit sides (213,214). The first and second outer unit ends (216,216*a*) are the opposite ends of the outer unit (202) separated by and coterminous with the first and second outer unit faces and sides (211,212,213, 214).

The inlet (206) is a conduit for wood to be processed to move into the outer unit interior (215), in this variant the inlet (206) is shown as an essentially circular pipe extending away from the inlet plate (210) which forms part of the first outer unit face (211). In use the inlet (206) is uppermost so that wood to be processed is gravity fed into a portion of the outer unit interior (215).

Each outer unit side (213,214) includes a cutting unit support (217,218) and an outer unit frame (219). The cutting unit supports (217,218) are essentially parallel, and each extends along at least part of the length of the wood processing device (1). In this seventh variant the cutting unit supports (217,218) are adjacent, but separated from, the first outer unit face (211).

These cutting unit supports (217,218) are configured to engage with, or support, complementary features of the cutting unit (203) so that the cutting unit (203) can move along the length of the wood processing device (1) within the outer unit interior (215). Each cutting unit support (217,218) is shown as being adjacent or coterminous with an uppermost surface (uppermost when the wood processing device (1) is in use) of the innermost portion of a lower flange of an 'I' beam (219). In the simplest form each cutting unit support (217,218) is the upper surface of the 'I' beam (219) lowermost flange, in other forms it can be a strip of material attached (releasably or permanently) to that upper surface of the 'I' beam (219) flange.

Referring to any of FIGS. 47 to 52 where necessary the wood processing device (1) is shown with the outer unit (202) cross-sectioned to reveal the cutting unit (203) including a cutting blade (220), a cutting unit base (222) and two cutting unit sides (224,225) in more detail. The cutting blade (220) lies immediately adjacent the first outer unit face (211) and the cutting unit base (222) lies adjacent the second outer unit face (212) in a wood guide (226) and each cutting unit side (224,225) lies adjacent one outer unit side (213,214). Each cutting unit side (224,225) rigidly links, directly or in some configurations indirectly, the cutting blade (220) and the cutting unit base (222).

Figure 47:
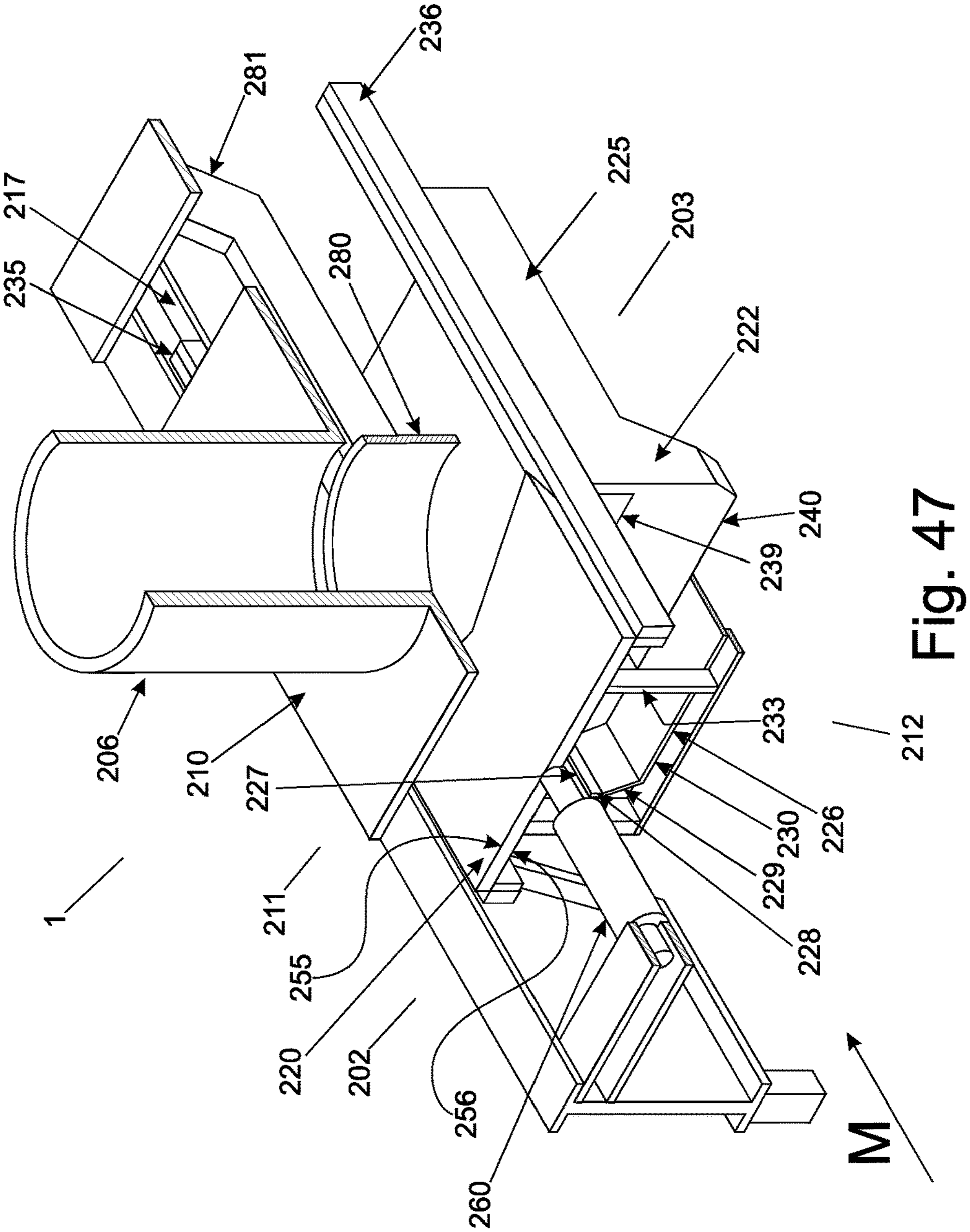
FIG. 47 is an isometric view of the seventh variant of the wood processing device with the outer unit sectioned along the line J-J.
Figure 51:
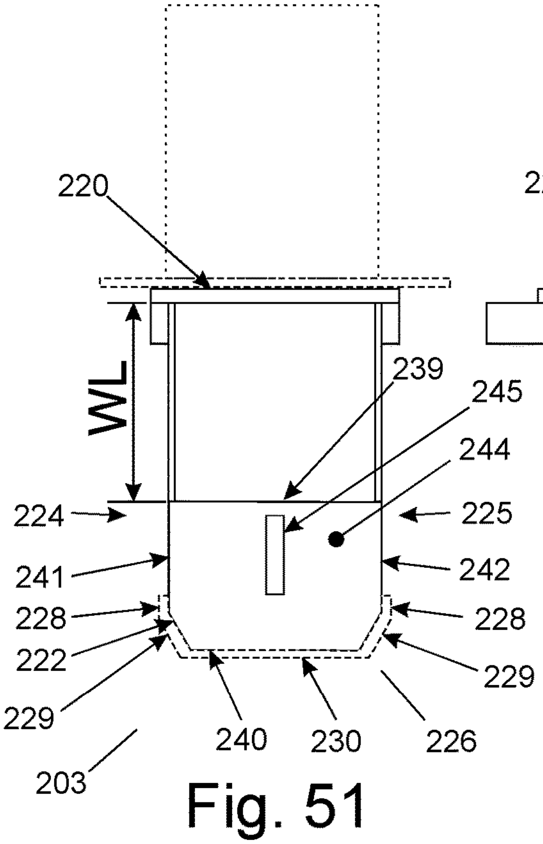
FIG. 51 is an end view of the cutting unit from the seventh variant of the wood processing device viewed in the direction of arrow M, with the inlet, inlet plate and wood guide shown in dashed lines.

Referring to FIG. 47 and FIG. 51 where necessary, the wood guide (226) is shown as a longitudinally aligned open channel that terminates at a splitter (233). The wood guide (226) includes two guide sides (227), each including a first guide section (228) and a second guide section (229), and a guide base (230). Where, in an end view, the two first guide sections (228) are parallel, and each second guide section (229) is angled with respect to both the first guide section (228) and the guide base (230) terminal end that it links. The guide base (230) is shown approximately perpendicular to the first guide sections (228). One terminal end of each first guide section (228) forms one of the peripheral edges of the channel. In transverse cross section the wood guide (226) has one line of symmetry which passes through the guide base (230). The guide base (230) is adjacent to or coterminous with the second outer unit face (212). It should be noted that the cross-sectional shape of the wood guide (226) can be anything suitable to support wood for processing with the bark (or if the wood is debarked, the exposed outer surface) in contact with the wood guide (226).

Figure 52:
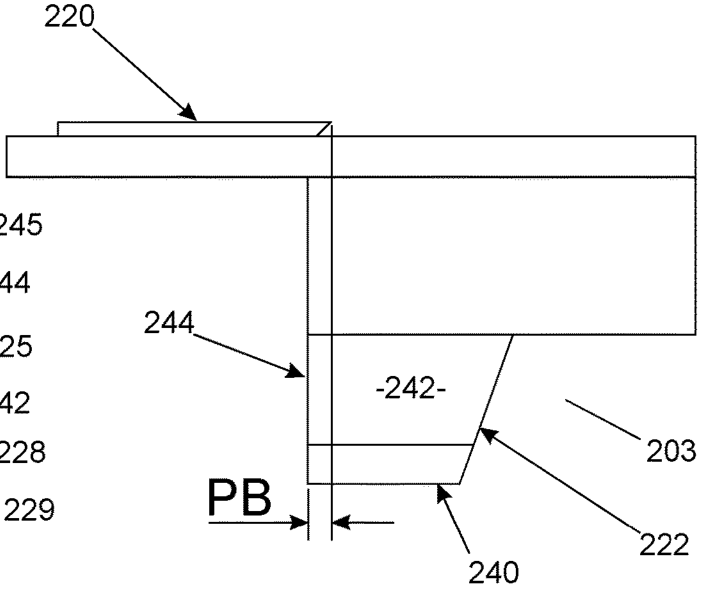
FIG. 52 is an end view of the cutting unit from the seventh variant of the wood processing device.

As shown in FIG. 51 and/or FIG. 52, the cutting unit base (222) includes a support face (239), a guide face (240), two base walls (241,242) and a pushing surface (244). Where the support face (239) and guide face (240) are opposite faces of the cutting unit base (222) with the base walls (241,242) forming the sides. The pushing surface (244) is coterminous with an edge of the support face (239), guide face (240) and both base walls (241,242).

The base walls (241,242) are in most cases coterminous with a portion of the cutting unit sides (224,225).

The support face (239) is a planar surface that is approximately parallel to the cutting blade (220) vertically separated from the cutting blade (220), when the wood processing device (1) is in use with the inlet (206) uppermost, by a distance WL. The distance WL is essentially the length of firewood (processed wood (62)) required and it will be determined by the piece of equipment the firewood (processed wood (62)) is to be used in.

The pushing surface (244) is the end of the cutting unit base (222) adjacent, but longitudinally separated from, the cutting blade (220) by a distance PB (see FIG. 52). The pushing surface (244) is shown as essentially perpendicular to the plane of the cutting blade (220) and the guide base (230). The pushing surface (244) includes a splitting aperture (245) that is dimensioned to accept portions of the splitter (233) (see FIG. 46 or FIG. 47).

As shown in FIG. 47 the guide face (240) is the face of the cutting unit base (222) that lies immediately adjacent the wood guide (226). The guide face (240) and the wood guide (226) have complementary transverse cross-sections so that in use the cutting unit (203) can move along at least a portion of the length of the wood guide (226) (see FIG. 47). In many cases there is a slight gap between the guide face (240) and the wood guide (226), however in some configurations they may include low friction materials (solid, semi-fluid, applied to or applied between) to allow the guide face (240) to move smoothy along the length of the wood guide (226).

Referring to FIG. 47, or where necessary any of FIGS. 48 to 51, the complementary features of the cutting unit (203) that engage with or are supported by the cutting unit supports (217,218), both shown in FIG. 46, are support engagers (235,236). Each of these support engagers (235, 236) is shown as a rectangular section strip of material attached to, or formed into, the associated cutting unit side (224,225). Each support engager (235,236) extends, at least partially, along the length of the cutting unit (203).

Figure 50:
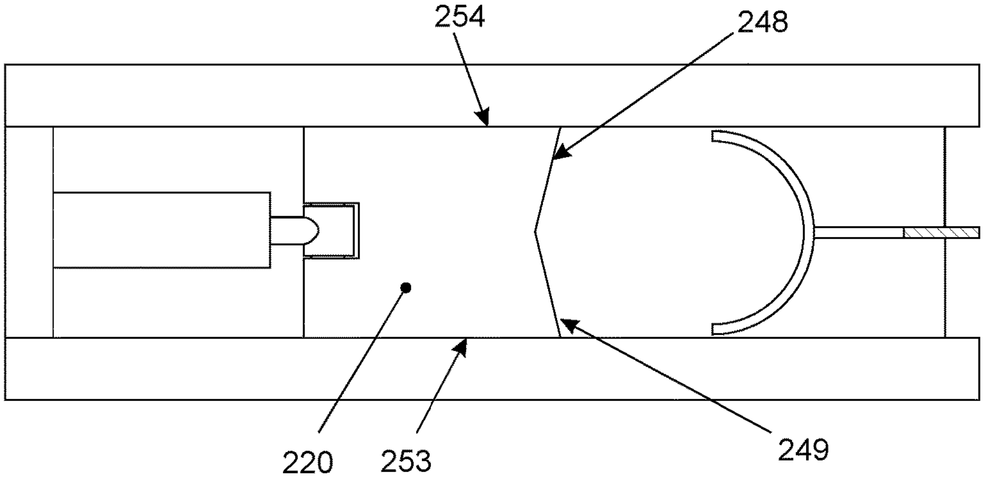
FIG. 50 is a cross-sectional plan view of the seventh variant of the wood processing device along the line L-L in the direction of the arrows, the movement device is not cross sectioned for clarity.

Referring to FIG. 50 the cutting blade (220) is a plate with a 'V' shaped cutting blade edge (248) at one end, the blade edge end (249). As shown, the cutting blade (220) is a concave pentagon with two parallel sides (blade sides (253, 254)) with the concave portion forming the cutting edge (248). In this variant the concave pentagon has a single axis of symmetry parallel to the blade sides (253,254) that passes through the vertex in the concave portion, other variants may have no axis of symmetry.

Referring to FIG. 47, or where necessary any of FIGS. 48 to 51, the cutting blade further includes a first blade face (255) and a second blade face (256). When the wood processing device (1) is in use, the first blade face (255) and the second blade face (256) are, respectively, the uppermost and lowermost faces of the cutting blade (220).

Referring to FIG. 47 the wood processing device further includes a primary movement device (260) which is shown as a hydraulic piston attached to the cutting blade (220) of the cutting unit (203). This primary movement device (260) allows the cutting unit (203) to be moved along a portion of the length of the wood processing device (1).

Figure 46A:
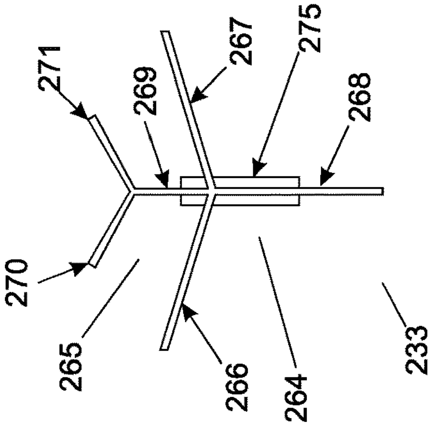
FIG. 46A is an end view of the splitter separated from the wood processing device shown in FIG. 46.

Referring to FIG. 46 and FIG. 46A the splitter (233) is shown as two 'Y' shaped splitter portions (264,265), a first splitter portion (264) and a second splitter portion (265), stacked on top of each other. The arms of the first splitter portion (264), the first portion arms (266,267), are attached to the adjacent outer unit sides (213,214), with the stem of the first splitter portion (264), the first stem (268), terminating close to or at the second outer unit face (212). The exposed end of the stem of the second splitter portion (265), the second stem (269), is coterminous with the intersection between the first portion arms (266,267) and first stem (268). The arms of the second splitter portion, the second portion arms (270,271), terminate before reaching the adjacent outer unit sides (213,214). In other words, the splitter (233) looks similar to a branched arm of a snowflake extending from the second outer unit face (212). The splitter (233) is shown at the terminal end of the wood guide (226) that is closest to the primary movement device (260). It should be noted that this particular configuration of splitter (233), though preferred, is only one possible configuration and crosses, stars, asterisk or any other layout of strips that can be used to split wood pushed through it are intended.

Figure 54:
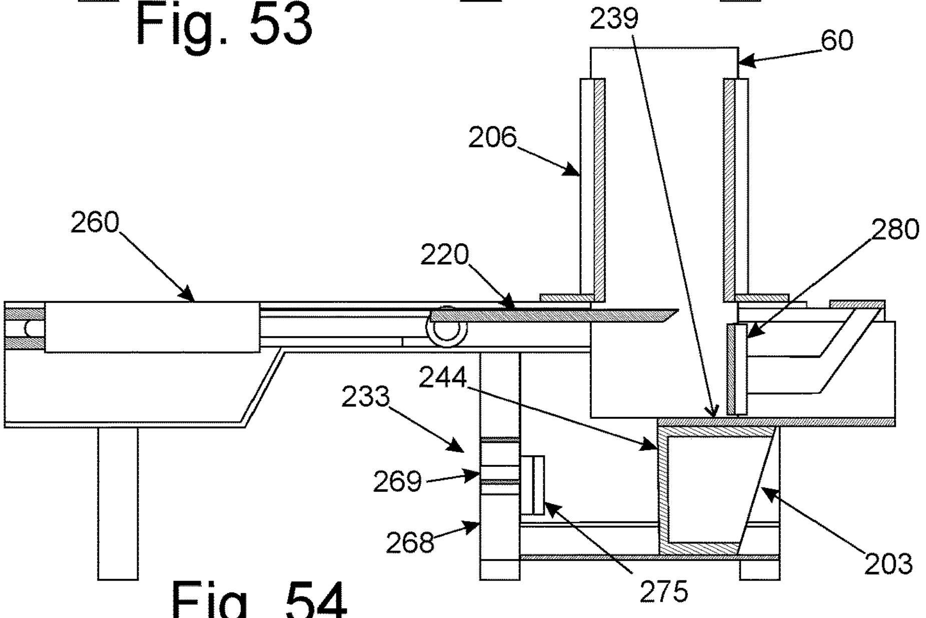
FIG. 54 is a cross sectional side view of the seventh variant of the wood processing device along the line J-J in the direction of the arrows in a second position with the cutting blade partially through the wood.

Referring to FIG. 54 the splitter (233) is shown as including a splitter blade (275) which is a flat blade aligned with the stems (268, 269) that extends away from the splitter (233) towards the pushing surface (244). The splitting aperture (245) (see FIG. 51) is dimensioned to accept the splitter blade (275), and it will normally be a clearance fit.

Referring to 47 and FIG. 50 where necessary the wood processing device (1) including a wood stop (280) attached to the first outer unit face (211) by a stop support (281). The wood stop (280) is a semi-circular section of pipe that is aligned with the inlet (206), located on the opposite side of the inlet (206) to the primary movement device (260). The wood stop (280) is physically separated from the inlet plate (210) sufficiently to allow the cutting blade (220) to pass between the two. In addition, the wood guide (280) is spaced away from the support face (239) and cutting unit sides (224,225) sufficiently to allow the cutting unit (203) to move with respect to the wood stop (280).

Figure 49:
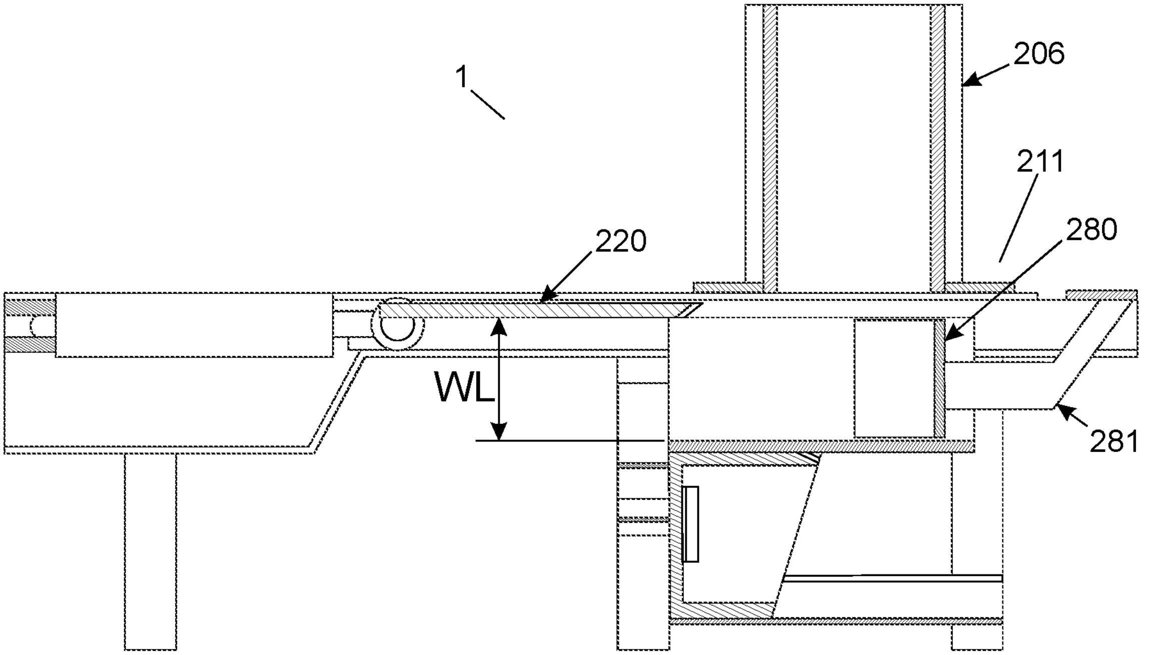
FIG. 49 is a cross sectional side view of the seventh variant of the wood processing device along the line J-J in the direction of the arrows.

As shown in FIG. 47 and FIG. 49 the stop support (281) is, in side view, a dog legged piece of plate that rigidly attaches the wood stop (280) to a portion of the first outer unit face (211) whilst allowing the cutting blade (220) to move across the full width of the inlet (206).

Figure 53:
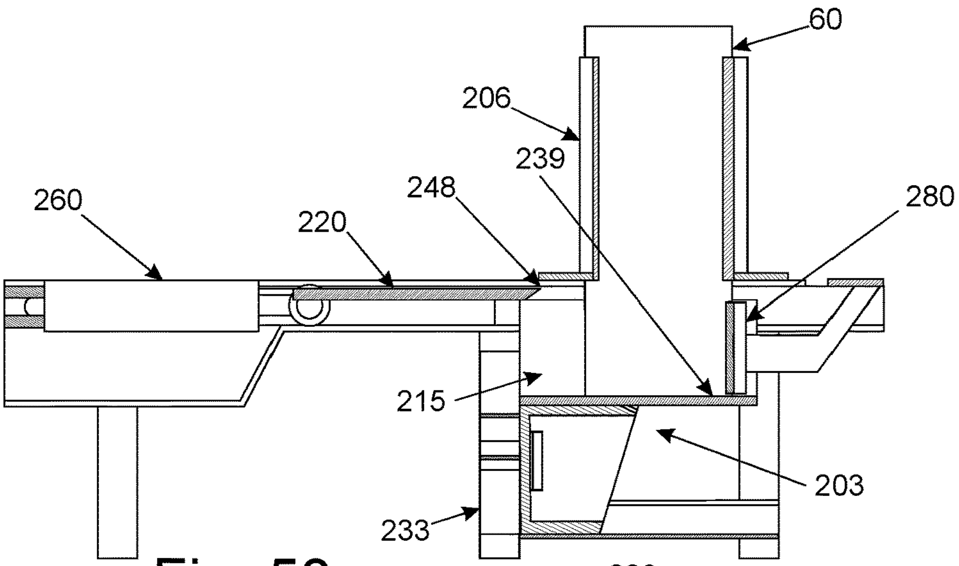
FIG. 53 is a cross sectional side view of the seventh variant of the wood processing device along the line J-J in the direction of the arrows in a first position with wood resting on the support face.

Referring to FIGS. 53 to 57 the operation of the wood processing device (1) will now be described in more detail where:

In FIG. 53 the pushing surface (244) is shown immediately adjacent the splitter (233) and wood for processing (60) is shown passing along the inlet (206) into the outer unit interior (215) and resting on the support face (239). The cutting blade edge (248) is clear of the wood for processing (60). The primary movement device (260) then starts to push the cutting unit (203) away from the splitter (233) forcing the cutting blade (220) into the wood for processing (60). If the inlet and wood stop (280) are aligned then this pushes the wood for processing (60) into contact with the wood stop (280).

In FIG. 54 the primary movement device (260) has pushed the cutting blade (220) through about 50% of the wood for processing (60). As the wood for processing (60) is prevented from moving with the cutting unit (203) by the wood stop (280) the support face (239) has moved with respect to the wood for processing (60).

Figure 55:
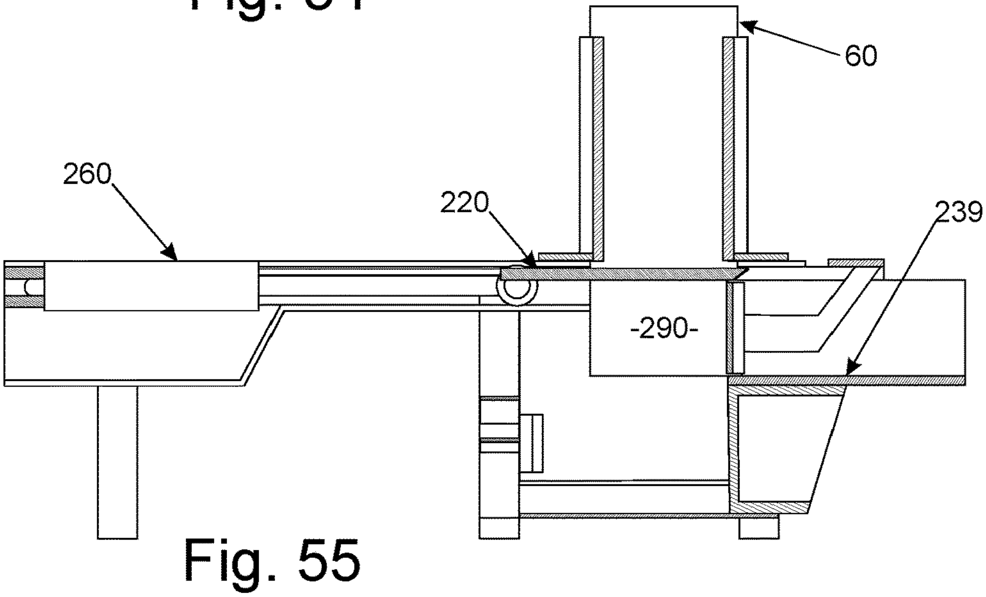
FIG. 55 is a cross sectional side view of the seventh variant of the wood processing device along the line J-J in the direction of the arrows in a third position with the cutting blade through the wood with the cut-off section still resting on the support face.

In FIG. 55 the primary movement device (260) has pushed the cutting blade (220) completely through the wood for processing (60) forming a wood cut-off (290) which is supported by a small section of the support face (239) that lies under the cutting blade (220), and it is held in place between the cutting blade (220) and this small section of the support face (239). The primary movement device (260) then reverses direction and pulls the wood cut-off (290) off of the support face (239).

Figure 56:
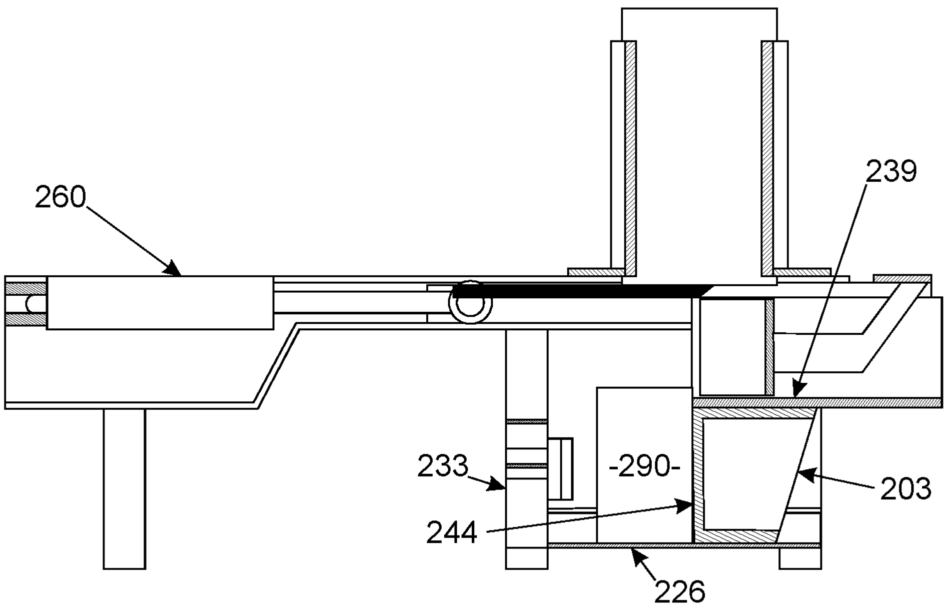
FIG. 56 is a cross sectional side view of the seventh variant of the wood processing device along the line J-J in the direction of the arrows in a fourth position with the cutting blade partially returned to the first position with the cut off section now being pushed forward by the pushing surface.

In FIG. 56 the wood cut-off (290) has fallen onto the wood guide (226) in front of the pushing surface (244) as one end of the wood cut-off (290) was supported by the support face (239) as it fell it has rotated approximately 90° to lie on its side. The pushing surface (244) then contacts the wood cut-off (290). The primary movement device (260) continues to move the cutting unit (203) causing the pushing surface (244) to move the wood cut-off towards the splitter (233).

Figure 57:
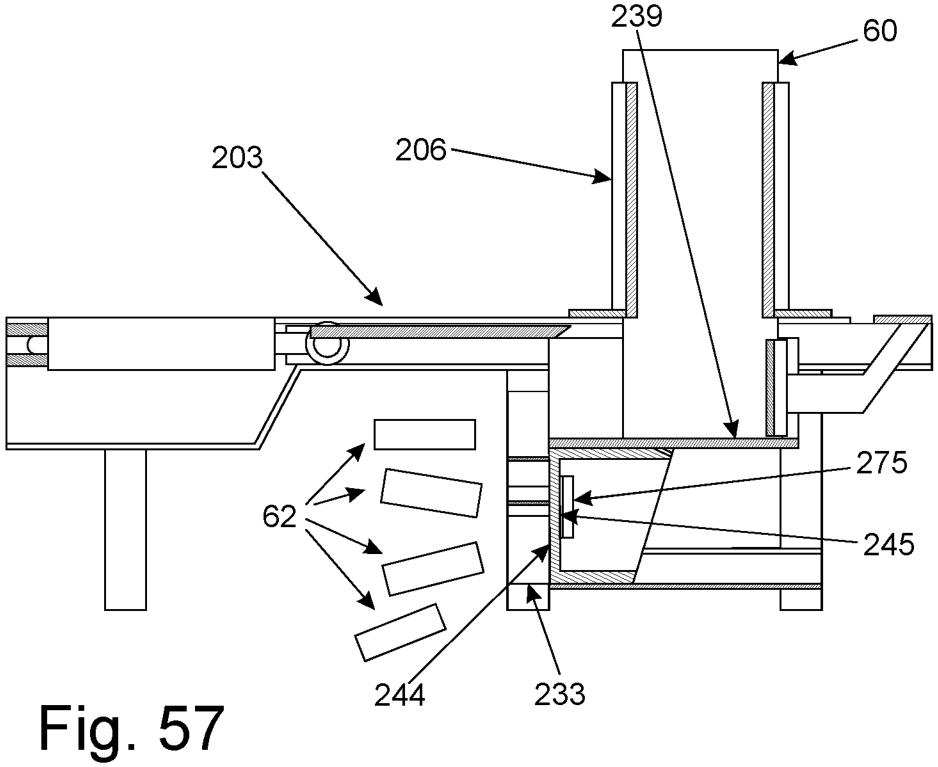
FIG. 57 is a cross sectional side view of the seventh variant of the wood processing device along the line J-J in the direction of the arrows back in the first position with wood having dropped onto the support face and the cut off section pushed through the splitter by the pushing surface forming firewood, or split wood.

In FIG. 57 the cutting unit (203) has been moved back to where the pushing surface (244) is immediately adjacent the splitter (233), with the splitter blade (275) completely inserted into the splitting aperture (245). The wood cut-off (290) has been forced through the splitter (233) forming processed wood (62). The cutting blade (220) is now clear of the inlet (206) and as such the wood for processing (60) falls until it contacts the support face (239) ready for the process to start again.

Eighth Variant

As the mass of the wood cut-off (290) (see FIG. 56) increases allowing it to simply fall onto the wood guide (226) increases the chance that the wood guide (266), or other parts of the wood processing device (1) could be damaged, to ameliorate the possibility of this occurring an eighth variant will be described.

In addition to the potential damage that a large diameter wood cut-off (29) (see FIG. 56) could cause it has been found that the aspect ratio (length to height when viewed side on) can cause the wood cut off (290) to fall back into the as cut orientation which is misaligned with the splitter (233).

Figure 59:
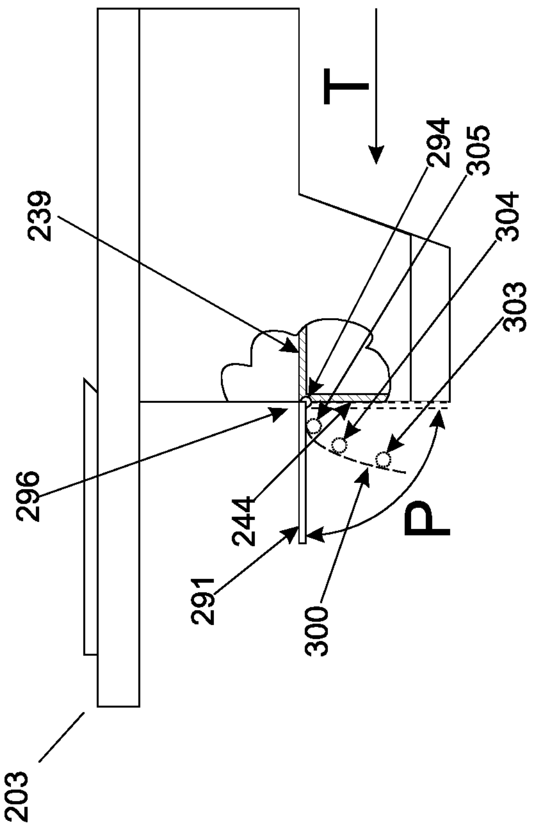
FIG. 59 is a side view of the cutting unit for the eighth variant with the auxiliary support co-planar with the support face in a support configuration (solid lines) and a pushing configuration (dashed lines) with a portion of the cutting unit side and cutting unit base cross-sectioned to show the support face and pushing surface.
Figure 58:
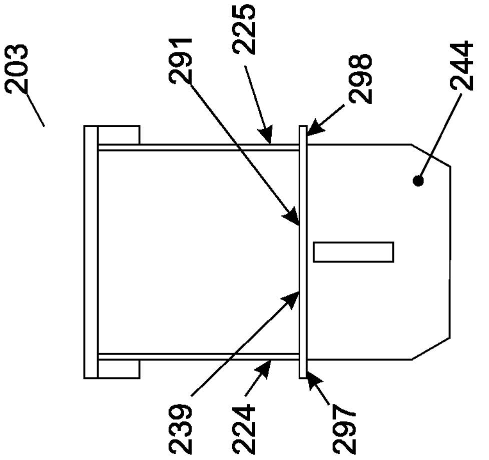
FIG. 58 is an end view of the cutting unit for the eighth variant with the auxiliary support co-planar with the support face.

Referring to FIGS. 58 and 59 the cutting unit (203) of an eighth variant is shown. This eighth variant includes an auxiliary support (291) and support hinge (294). The support hinge (294) is located where the support face (239) and pushing surface (244) are coterminous.

Referring to FIG. 59, the auxiliary support (291) is shown co-planar with the support face (239) in a support configuration (solid lines in FIG. 59) and in contact with the pushing surface (244) in a pushing configuration (dashed lines in FIG. 59). In the support configuration the support face (239) and auxiliary support (291) form an extended support surface (296). The support face (239) and auxiliary support (291) are connected by the support hinge (294) which allows the angle of the auxiliary support (291) to move between the support configuration and the pushing configuration along arrow P.

Referring to FIG. 58 portions, auxiliary guide portions (297,298), of the auxiliary support (291) are shown extending beyond the cutting unit sides (224,225). This is to allow the auxiliary support (291) to move along an auxiliary path (300) (shown as a dashed line over a series of dotted circles in FIG. 59) as the cutting unit (203) moves in the direction of arrow T. The series of dotted circles represent a series of auxiliary pins (303,304,305) extending from the outer unit (202) towards the cutting unit (203), three are shown but any number from 1 to 10 could be used to provide a smooth transition of the auxiliary support between the support configuration and the pushing configuration.

Figure 60:
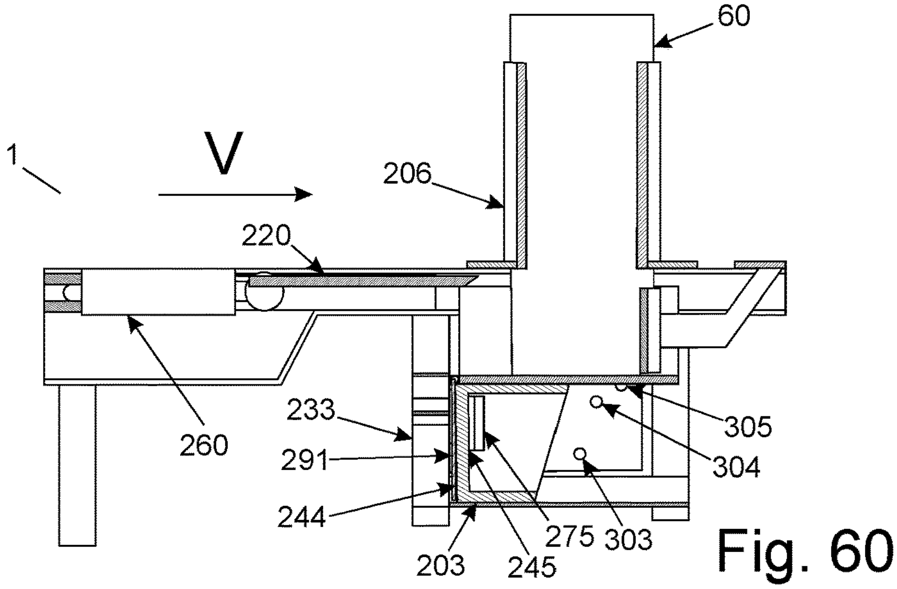
FIG. 60 is a cross sectional side view of the eighth variant of the wood processing device which includes a hinged auxiliary support, along the line J-J in the direction of the arrows with the cutting blade clear of the inlet with wood for processing resting on the support face and the auxiliary support immediately adjacent the splitter.
Figure 61:
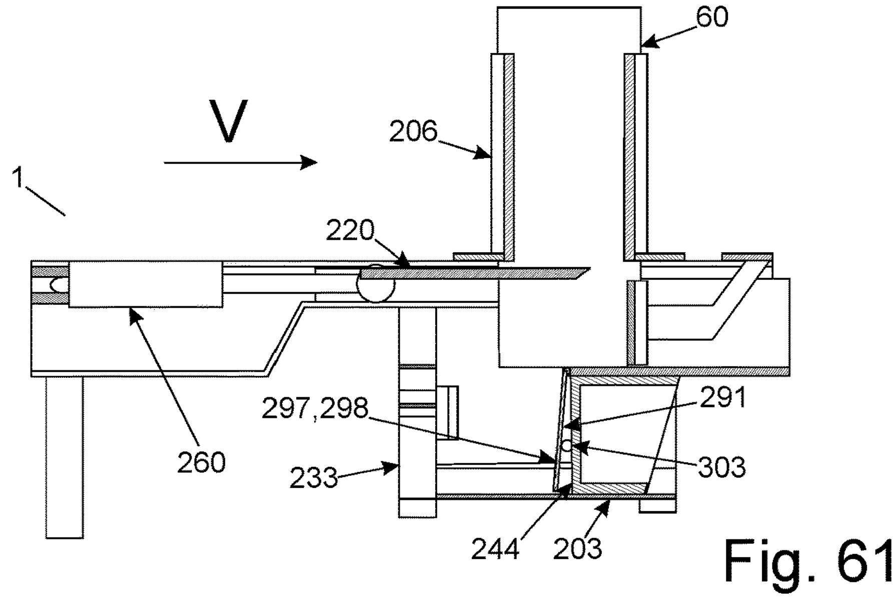
FIG. 61 is a cross sectional side view of the eighth variant of the wood processing device which includes a hinged auxiliary support, along the line J-J in the direction of the arrows with the cutting blade partially through the wood being processed and the auxiliary support engaging with a first auxilliary pin.

One way of operating this eighth variant will be described by referring to FIG. 60 to FIG. 65, where:

In FIG. 60 the wood processing device (1) is shown with the pushing surface (244) immediately adjacent the splitter (233), with the splitter blade (275) extending through the auxiliary support (291) and splitting aperture (245), in this position the wood for processing (60) in the inlet (206) is in contact with the support face (239). The auxiliary support (291) is in the pushing configuration. The cutting unit (203) is then moved in the direction of arrow V, moving the pushing surface (244) away from the splitter (233) and the cutting blade (220) through the wood for processing (60);

In FIG. 61 the auxiliary guide portions (297,298) have contacted the first auxiliary pin (303) and the auxiliary support (291) has moved away from the pushing surface (244), at the same time the cutting blade (220) is moving through the wood for processing (60). The auxiliary support (291) is starting to move from the pushing configuration to the support configuration. The support face (239) moves underneath the wood for processing (60). The cutting unit (203) continues to move in the direction of arrow V.

Figure 62:
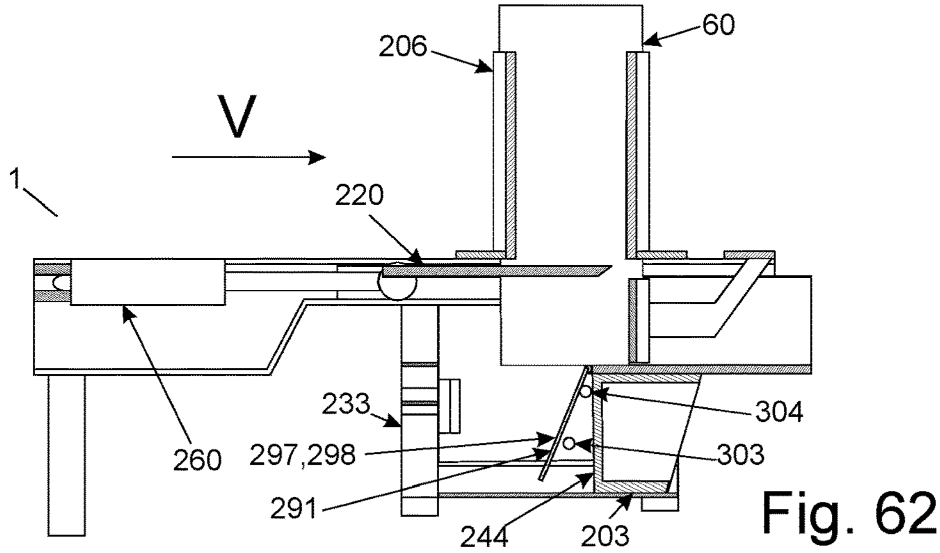
FIG. 62 is a cross sectional side view of the eighth variant of the wood processing device which includes a hinged auxiliary support, along the line J-J in the direction of the arrows with the cutting blade partially through the wood being processed and the auxiliary support engaging with a second auxilliary pin.

In FIG. 62 the auxiliary guide portions (297,298) have contacted the second auxiliary pin (304) and the auxiliary support (291) has continued to move away from the pushing surface (244) and first auxiliary pin (303), at the same time the cutting blade (220) is moving through the wood for processing (60). The auxiliary support (291) is continuing to move from the pushing configuration to the support configuration. The support face (239) moves underneath the wood for processing (60). The cutting unit (291) continues to move in the direction of arrow V.

Figure 63:
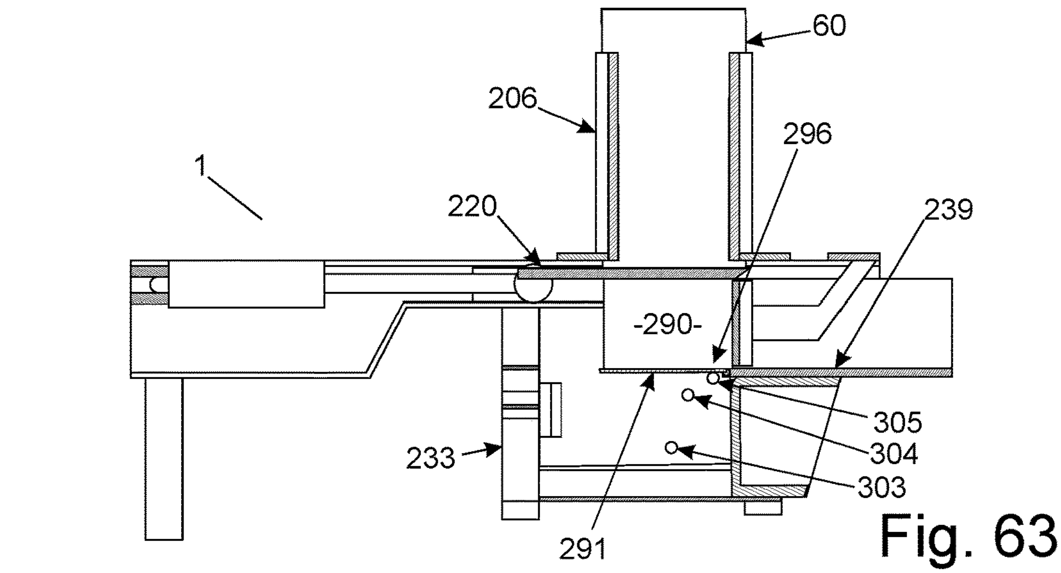
FIG. 63 is a cross sectional side view of the eighth variant of the wood processing device which includes a hinged auxiliary support, along the line J-J in the direction of the arrows with the cutting blade partially through the wood being processed and the auxiliary support engaging with a third auxilliary pin. The wood is now supported by both the support surface and the auxiliary support.

In FIG. 63 the cutting unit is stationary, with the cutting blade having passed through the wood for processing (60) creating a wood cut-off (290) and the auxiliary support rests on the third auxiliary pin (305) forming the extended support surface (296). The auxiliary support (291) is in the support configuration. The wood cut-off (290) may rest on the extended support surface (296) or the auxiliary support (291) alone.

Figure 64:
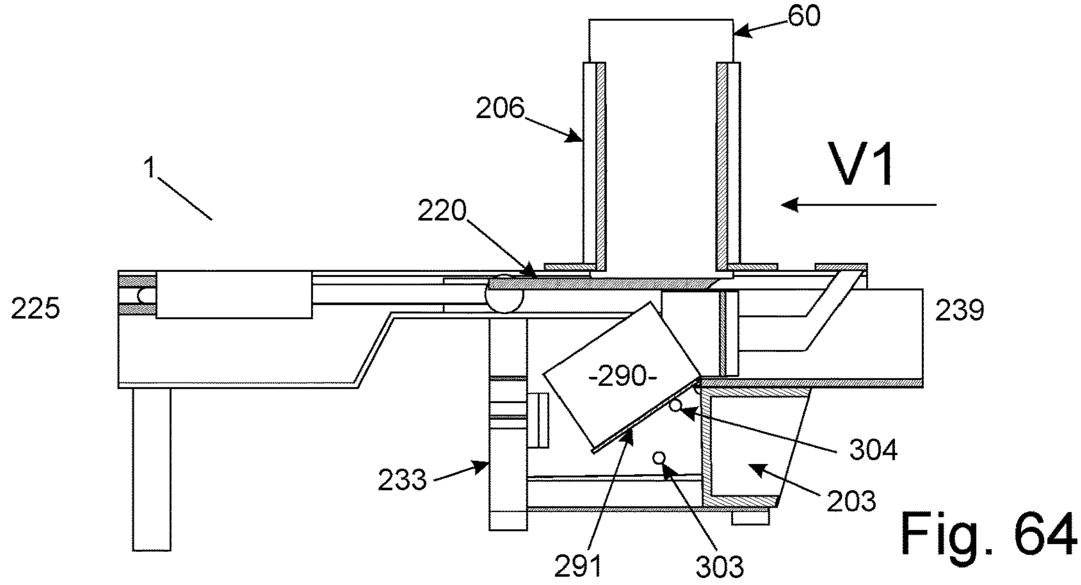
FIG. 64 is a cross sectional side view of the eighth variant of the wood processing device which includes a hinged auxiliary support, along the line J-J in the direction of the arrows with the cutting blade moved in the direction of arrow V1 the auxiliary support has now disengaged with the first auxiliary pin and engaged with the second auxiliary pin.

In FIG. 64 the cutting unit (203) has been moved in the direction of arrow V1, towards the splitter (233) and the auxiliary support (291) has moved off of the first auxiliary pin (303) onto the second auxiliary pin (304). This moves the auxiliary support (291) away from the support configuration towards the pushing configuration.

Figure 65:
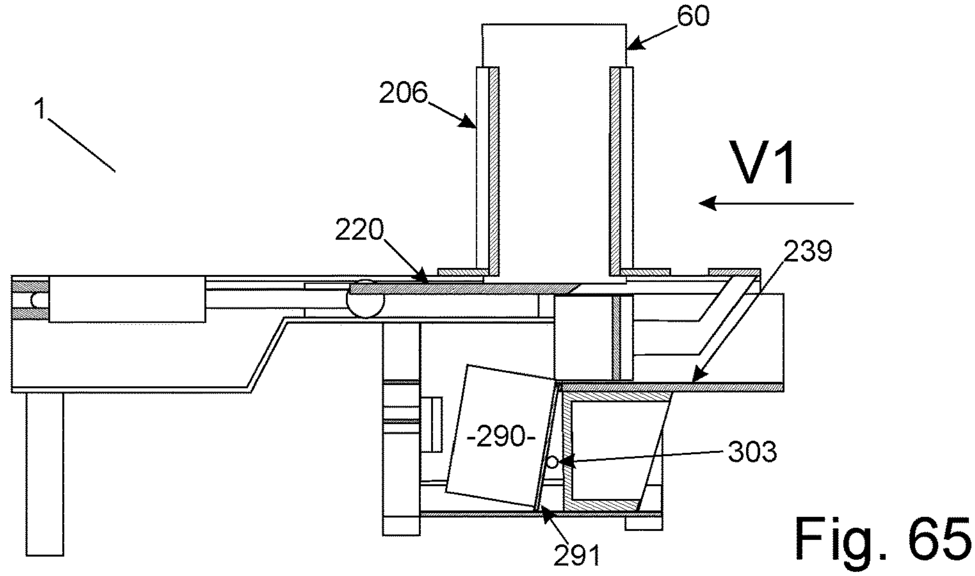
FIG. 65 is a cross sectional side view of the eighth variant of the wood processing device which includes a hinged auxiliary support, along the line J-J in the direction of the arrows with the cutting blade moved in the direction of arrow V1 the auxiliary support has now disengaged with the second auxiliary pin and engaged with the first auxiliary pin.

In FIG. 65 the cutting unit (203) has continued to move in the direction of arrow V1 and the auxiliary support (291) has contacted the first auxiliary pin (303), moving the auxiliary support (291) closer to the pushing configuration.

Figure 66:
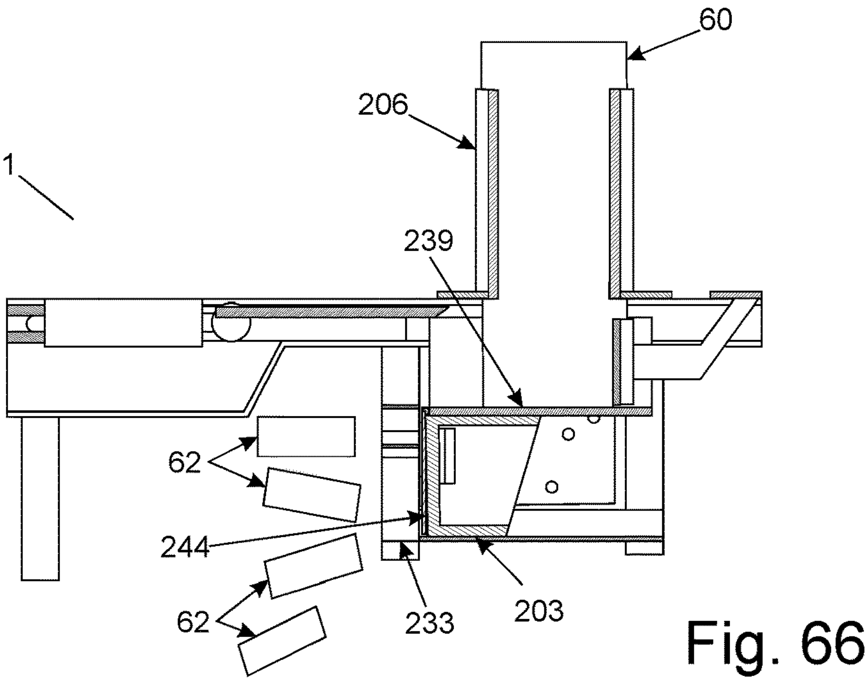
FIG. 66 is a cross sectional side view of the eighth variant of the wood processing device which includes a hinged auxiliary support, along the line J-J in the direction of the arrows with the cutting blade moved in the direction of arrow V1 and the wood cut-off pushed through the splitter forming processed wood with the auxiliary support engaged with the pushing surface.

In FIG. 66 the cutting unit (203) has moved back into the position it started, with the pushing surface (244) immediately adjacent the splitter (233) forcing the wood cut-off through the splitter (233) forming processed wood (62) and the wood for processing (60) has dropped onto the support face (239) ready to start again.

Figure 67:
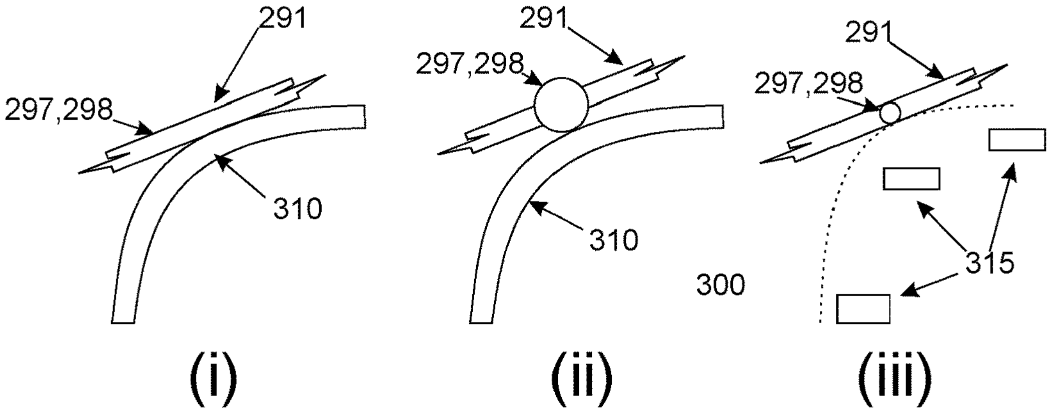
FIG. 67 is a series of partial side views showing variants of forming the auxiliary path.

Referring to FIG. 67 three alternatives for forming the auxiliary path (300) are shown, these are examples and can be combined with each other and the auxiliary pin (303, 304,305) configuration described previously.

FIG. 67(i) shows the auxiliary pins (303,304,305) (see FIG. 59) replaced with an auxiliary strip (310) which is a strip of material that follows the auxiliary path (300). In this variant the auxiliary guide portions (297,298) are extended portions of the auxiliary support (291).

FIG. 67(ii) shows a variation on the variant shown in FIG. 67(i), the auxiliary strip (310) is the same but the auxiliary guide portion (297,298) is a roller or similar extending from the auxiliary support (291).

FIG. 67(iii) shows three magnetic sources (315) located such that they form the auxiliary path (300) (shown as dotted line), the auxiliary guide portion (297,298) is a magnet oriented to be biased away from the magnetic sources (315).

Figure 48:
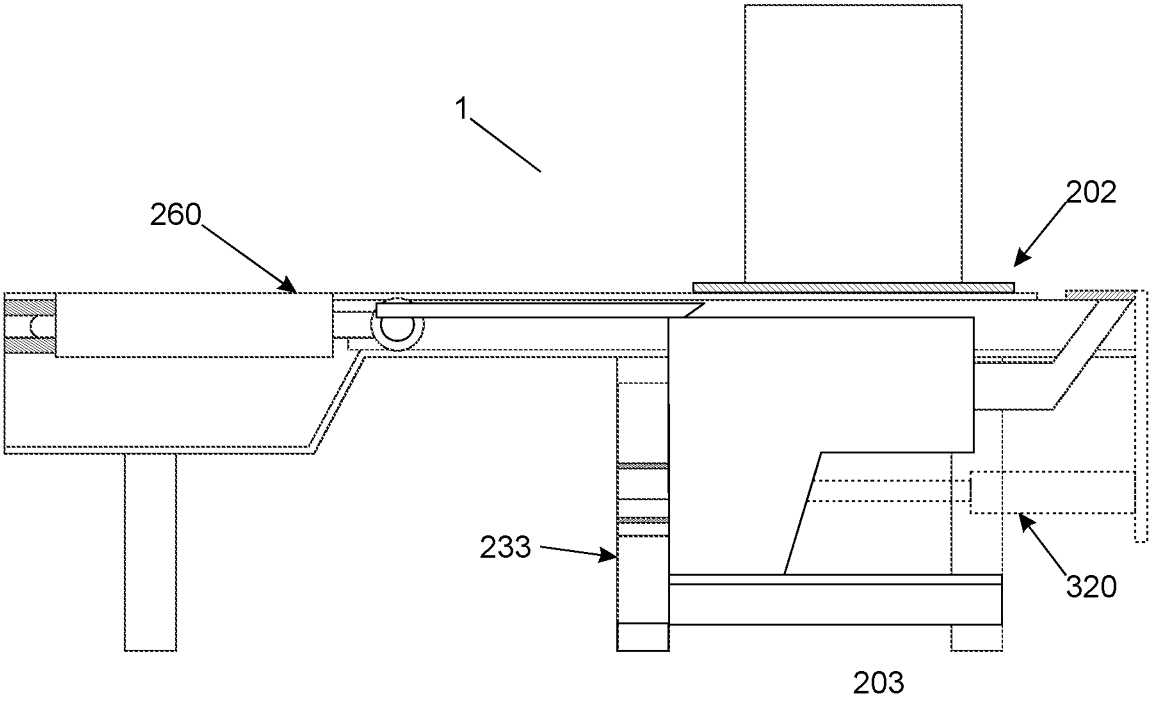
FIG. 48 is a cross sectional side view of the seventh variant of the wood processing device along the line K-K in the direction of the arrows.

Referring to FIG. 48 a secondary movement device (320) is shown in dashed lines, this secondary movement device (320) is shown as a second hydraulic ram attached to the outer unit (202) so that it pushes the cutting unit (203) towards splitter (233). This secondary movement device (320) may be necessary as hydraulic rams are usually more effective in one direction and the force required to push the wood cut-off (290) through the splitter (233) may be more than the primary movement device (260), see FIG. 62 for example, can deliver when in the pull direction. In addition this secondary movement device (320) increases the 'energy' or force available to carry out the splitting step.

Figure 68:
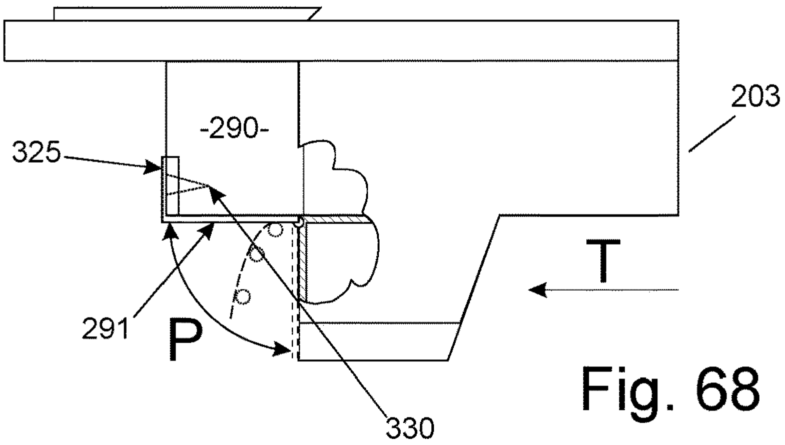
FIG. 68 is a side view of a modification of the cutting unit of the eighth variant which includes an auxiliary stop on the auxiliary support.

Referring to FIG. 68, a modification to the eighth variant is shown, in this modification the auxiliary support (291) includes an auxiliary stop (325) which is an upturned portion of the auxiliary support (291) at the exposed end of the auxiliary support (291) that in the support configuration is closest to the splitter (233). This auxiliary stop extends away from the auxiliary support (291) to form a stop for objects resting on the auxiliary support (291). For example, as shown, once the wood cut-off (290) is either in contact with the auxiliary stop (325), or moved into contact with the auxiliary stop (325) it cannot move further across the surface of the auxiliary support (291). As such as the auxiliary support moves from the support configuration to the pushing configuration the wood cut-off (290) stays on the auxiliary support (291). The auxiliary stop (291) can be shaped to replace the wood guide (226) (see FIG. 47) in the pushing position or incorporate auxiliary retention features (330) (shown as dashed lines) such as spikes, small blades or similar that are pushed into the wood cut-off (290) as it is formed. These auxiliary retention features (330) disengage as the wood cut-off (290) is pushed through the splitter (233) (see FIG. 47).

Figure 69:
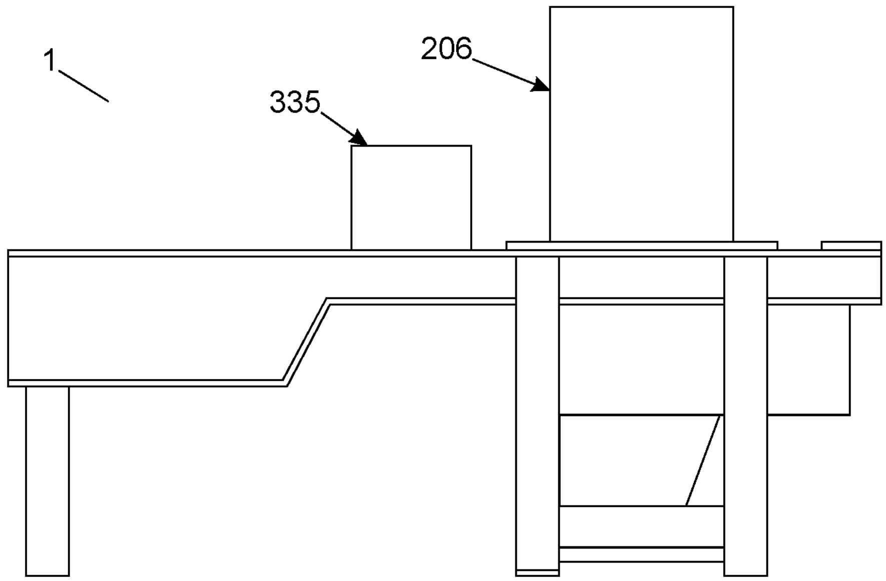
FIG. 69 is a side view of an embodiment of the wood processing device that incorporates a connection device.

Referring to FIG. 69 the wood processing unit (1) is shown with a connection device (335) configured to releasably engage with a complementary feature on an excavator, tractor or any other similar piece of earth moving or industrial/commercial equipment (not shown). The excavator, tractor or any other similar piece of earth moving or industrial/commercial equipment provides hydraulic and/or electrical power to the movement devices (51, 260, 320), see FIG. 47 for example, present. The connection device (335) allows the excavator, tractor or any other similar piece of earth moving or industrial/commercial/agricultural equipment to lift and move the wood processing equipment (1), orientating the inlet (6,206) uppermost when in use.

It should be noted that although not specifically shown, the movement device (52,260,320) may be a motor (electric or hydraulic) with a rack and pinion or anything else suitable to move the cutting unit (3,203) in relation to the inlet (6,206).

The eighth variant can be combined with the fourth and fifth variants with minor or no modifications to incorporate a branch trimmer or length cut-off blade. It should be remembered that if the orientation of the fifth variant shown in FIGS. 33 to 38 is changed it can be used to fell trees thus enabling the complete felling of the tree, trimming to length and production of firewood by combining the 4th, 5th and 7th variants or 4th, 5th and 8th variants. Combining the 4th, 5th and 8th variants provides one such device (this is not shown as a specific drawing as each variant is clearly able to be combined). In this combination the cut-off blade (140), wood stop (280) (see FIG. 49) and stop support (281) (see FIG. 49) will need to be able to co-exist, e.g. offset from each other. In addition, an aperture through the wood stop (281) will need to be incorporated to accommodate the passage of the cut-off blade (140).

Figure 70:
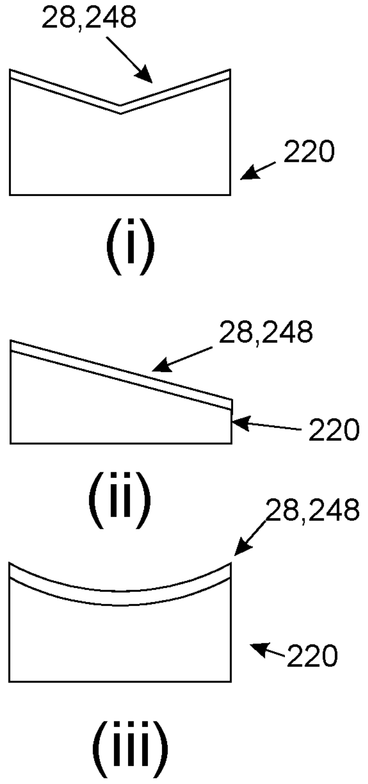
FIG. 70 is a plan view of some alternative cutting blade edge profiles (numbered (i) to (iii).

Referring to FIG. 70(i) to (iii) a series of plan views of the cutting blade (20, 220) with various cutting blade edge (28, 248) shapes are shown. FIG. 70(i) is the concave pentagon described previously, FIG. 70(ii) is trapezoidal and FIG. 70(iii) is a concave curve. In addition, these shapes can be combined to form a suitable cutting blade edge (28,248) shape and profile.

It should be noted that each support strip (17,18), cutting unit support (217,218) and support engager (235,236), when present, in any variant, may incorporate moveable members such as balls or rollers and/or be made of, or coated with, a friction reducing material (bronze, PTFE, ceramic lubricant, grease, solid lubricant, or any other low friction coating or material). Alternatively, each support strip (17,18) or cutting unit support (217,218) may include one or more magnetic source that co-operates with one or more magnetic source in the cutting unit (3,203) or support engagers (235,236), when present, to reduce the friction between the cutting unit (203) and the support strip (17,18) or cutting unit support (217, 218).

Alternative configurations of any of the variants shown may allow wood for processing (60) to form the wood cut off (29) as a final product.

The term 'wood for processing' may refer to a single piece of wood or multiple pieces of wood. This is intended to allow the inlet (6,206) to accept multiple smaller pieces of wood to be processed, or pre-split pieces of wood to be processed.

Where the term 'split', 'splitting' or similar are used these are not intended to limit the scope to along the grain size reduction as the wood processing device can operate across the grain.

The invention claimed is:

1. A wood processing device that includes an inlet, an outer unit and a cutting unit, where:

the outer unit includes a first outer unit face and outer unit sides at least partially surrounding an outer unit interior;

the inlet extends away from the first outer unit face;

the inlet is uppermost when the wood processing device is in use;

the inlet is configured to accept wood for processing and provide a path through the first outer unit face to the outer unit interior;

the cutting unit includes a cutting blade with a cutting blade edge; and the cutting unit lies, at least partially, within the outer unit interior with the cutting blade immediately adjacent, and essentially parallel to, the first outer unit face;

wherein the wood processing unit further includes at least one movement device configured to move the cutting unit such that the cutting blade edge moves across an open end of the inlet wherein, the cutting unit includes the cutting blade and a cutting unit base;

the cutting blade is adjacent the inlet;

the cutting unit base includes a support face and a pushing surface which are coterminous along one edge, such that, in use, the support face is the uppermost face of the cutting base and the pushing surface extends downwards; and the cutting blade and support face are spaced apart by a distance WL;

characterised in that the wood processing device further includes a splitter that faces the pushing surface and the at least one movement device is configured to move the cutting blade across the open end of the inlet as it increases the distance between the pushing surface and the splitter, such that in a first position of the cutting unit, the cutting blade does not extend across the open end of the inlet and the pushing surface is adjacent the splitter and, in a second position of the cutting unit, the cutting blade extends completely across the open end of the inlet and the pushing surface is a maximum distance from the splitter.

2. The wood processing device as claimed in claim 1 wherein, the outer unit includes two longitudinally aligned support strips which, directly or indirectly, support the cutting unit and/or cutting blade.

3. The wood processing device as claimed in claim 1 wherein, the support face and the pushing surface are approximately at right angles.

4. The wood processing device as claimed in claim 1 wherein, in the second position, the support surface overlaps the open end of the inlet by a small amount.

5. The wood processing device as claimed in claim 4 wherein, the small amount is between 1% and 10% of a maximum dimension of the open end of the inlet.

6. The wood processing device as claimed in claim 1 wherein, the cutting unit base includes an auxiliary support and a support hinge, where the support hinge is coterminous with the pushing surface, support face and the auxiliary support such that:

in the first position the auxiliary support is in a pushing configuration in which the auxiliary support lies immediately adjacent the pushing surface and between the pushing surface and the splitter; and in the second position the auxiliary support is in a support configuration in which the auxiliary support in combination with the support face forms an essentially planar extended support surface; and when moving from the support configuration to the pushing configuration the auxiliary support moves along an auxiliary path which changes the angle of the auxiliary support in a controlled manner.

7. The wood processing device as claimed in claim 6 wherein, the auxiliary support includes guide portions that are configured to follow the auxiliary path.

8. The wood processing device as claimed in claim 7 wherein, the auxiliary path is formed by two or more auxiliary pins which the guide portions are configured to releasably engage.

9. The wood processing device as claimed in claim 6 wherein, a pre-formed channel or strip forms the auxiliary path.

10. The wood processing device as claimed in claim 7 wherein, the guide portions follow the auxiliary path without contacting any auxiliary pins or any surface of a channel or strip that forms the auxiliary path.

11. The wood processing device as claimed in claim 1 wherein, the pushing surface includes a splitting aperture dimensioned to accept an extended portion of the splitter, a splitting blade.

12. The wood processing device as claimed in claim 6 wherein, the auxiliary support includes auxiliary retention features configured to releasably engage with wood being processed.

13. The wood processing device as claimed in claim 1 wherein, the cutting blade edge, in plan view, is concave.

14. The wood processing device as claimed in claim 1 wherein said wood processing device further includes a primary trimming section which circumferentially surrounds a primary engagement section of the inlet, both the primary trimming section and the primary engagement section include a trimming blade, where each trimming blade includes a trimming blade edge, such that said trimming blade edges are configured to act cooperatively to cut an object that lies between them.

15. The wood processing device as claimed in claim 14 wherein said primary trimming section is configured to be moved circumferentially around the inlet and move the trimming blade edges towards then away from each other.

16. The wood processing device as claimed in claim 14 wherein the wood processing device further includes a drive unit configured to rotate the primary trimming section around the primary engagement section.

17. The wood processing device as claimed in claim 1 wherein, the cutting unit further includes a cut-off blade extending from, essentially perpendicular to, the cutting blade through an aperture in the outer unit, a cut-off aperture, said cut-off blade includes a cut-off blade edge which is an edge of the cut-off blade that lies closest to the inlet when the cutting unit is in a first position.

18. The wood processing device as claimed in claim 1 wherein, the wood processing device is configured to be attached to a piece of mobile equipment used in the forestry or agricultural industry.

19. The wood processing device as claimed in claim 4 wherein, the cutting unit base includes an auxiliary support and a support hinge, where the support hinge is coterminous with the pushing surface, support face and the auxiliary support such that:

in the first position the auxiliary support is in a pushing configuration in which the auxiliary support lies immediately adjacent the pushing surface and between the pushing surface and the splitter; and in the second position the auxiliary support is in a support configuration in which the auxiliary support in combination with the support face forms an essentially planar extended support surface; and when moving from the support configuration to the pushing configuration the auxiliary support moves along an auxiliary path which changes the angle of the auxiliary support in a controlled manner.

20. The wood processing device as claimed in claim 6 wherein said wood processing device further includes a primary trimming section which circumferentially surrounds a primary engagement section of the inlet, both the primary trimming section and the primary engagement section include a trimming blade, where each trimming blade includes a trimming blade edge, such that said trimming blade edges are configured to act cooperatively to cut an object that lies between them.

* * * * *